J. BRICKEN.
CALCULATING MACHINE.
APPLICATION FILED APR. 1, 1910.

1,094,054.

Patented Apr. 21, 1914.
22 SHEETS—SHEET 1.

Witnesses:

Inventor:
John Bricken
By Cheever & Cox
Attys

J. BRICKEN.
CALCULATING MACHINE.
APPLICATION FILED APR. 1, 1910.

1,094,054.

Patented Apr. 21, 1914.
22 SHEETS—SHEET 3.

Witnesses:
Inventor:
John Bricken
By Cheever & Cox
Attys.

J. BRICKEN.
CALCULATING MACHINE.
APPLICATION FILED APR. 1, 1910.
1,094,054.
Patented Apr. 21, 1914.
22 SHEETS—SHEET 4.
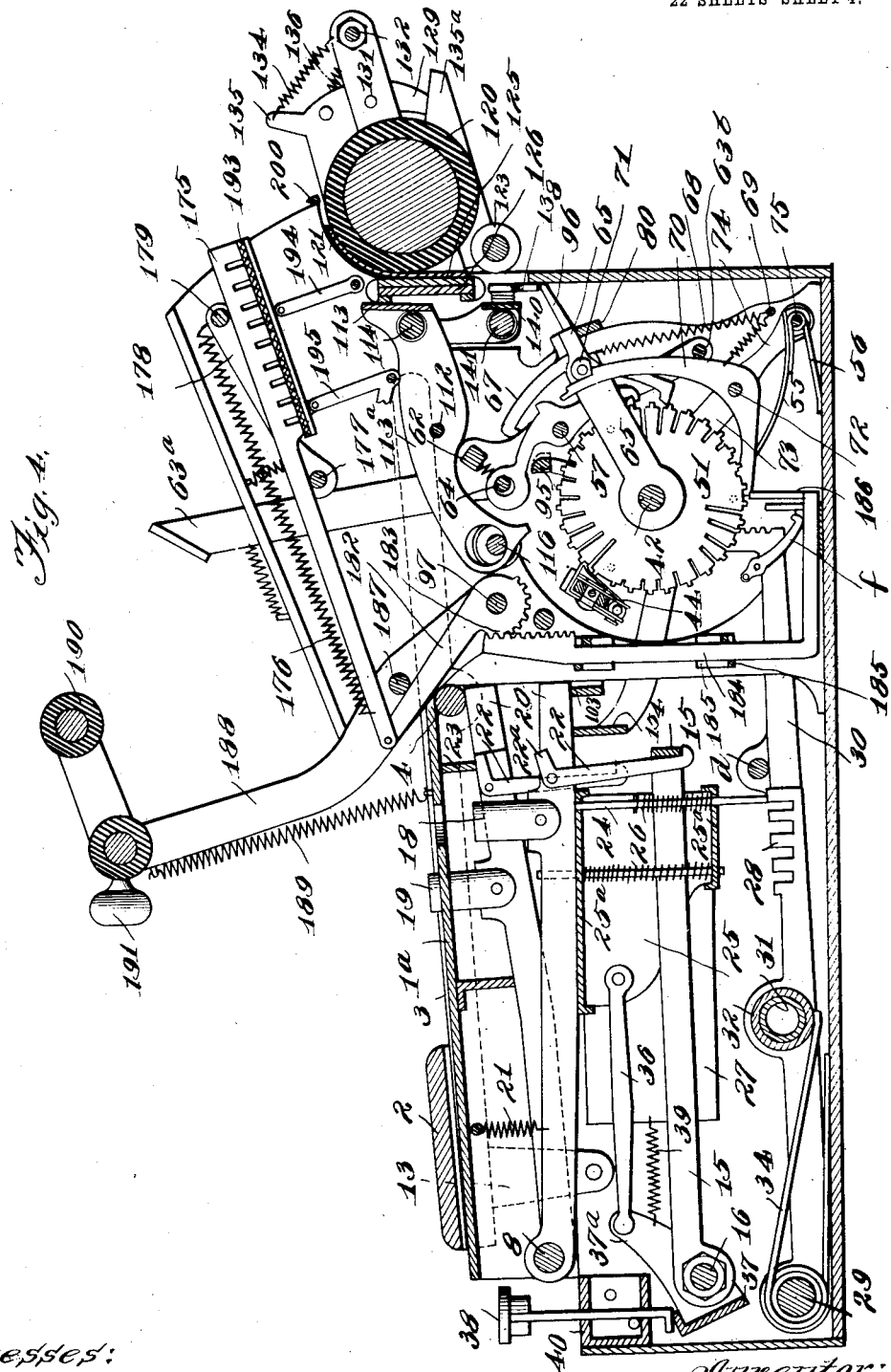
Witnesses:
Inventor:
John Bricken
By Cheever & Cox
Attys

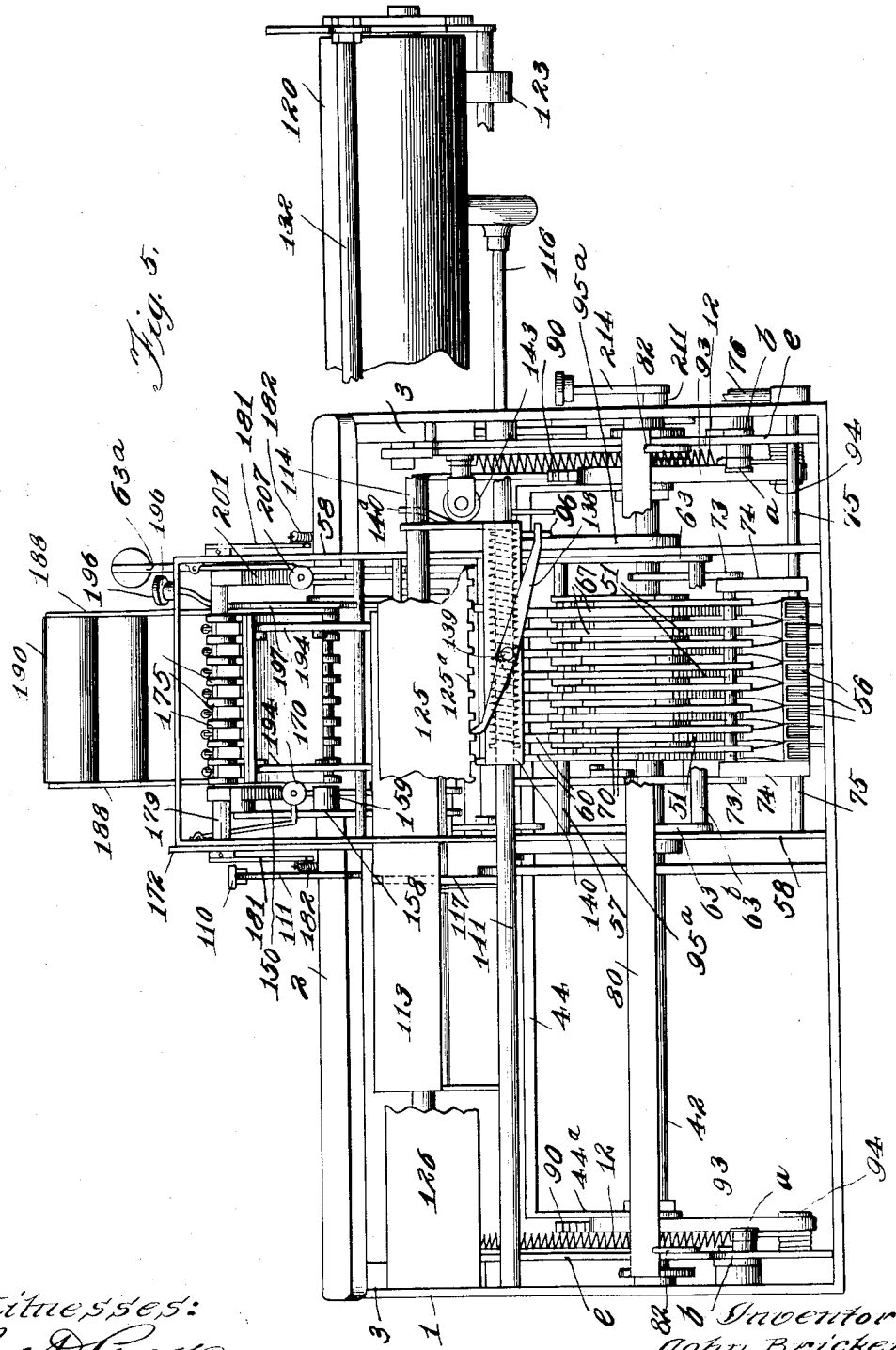

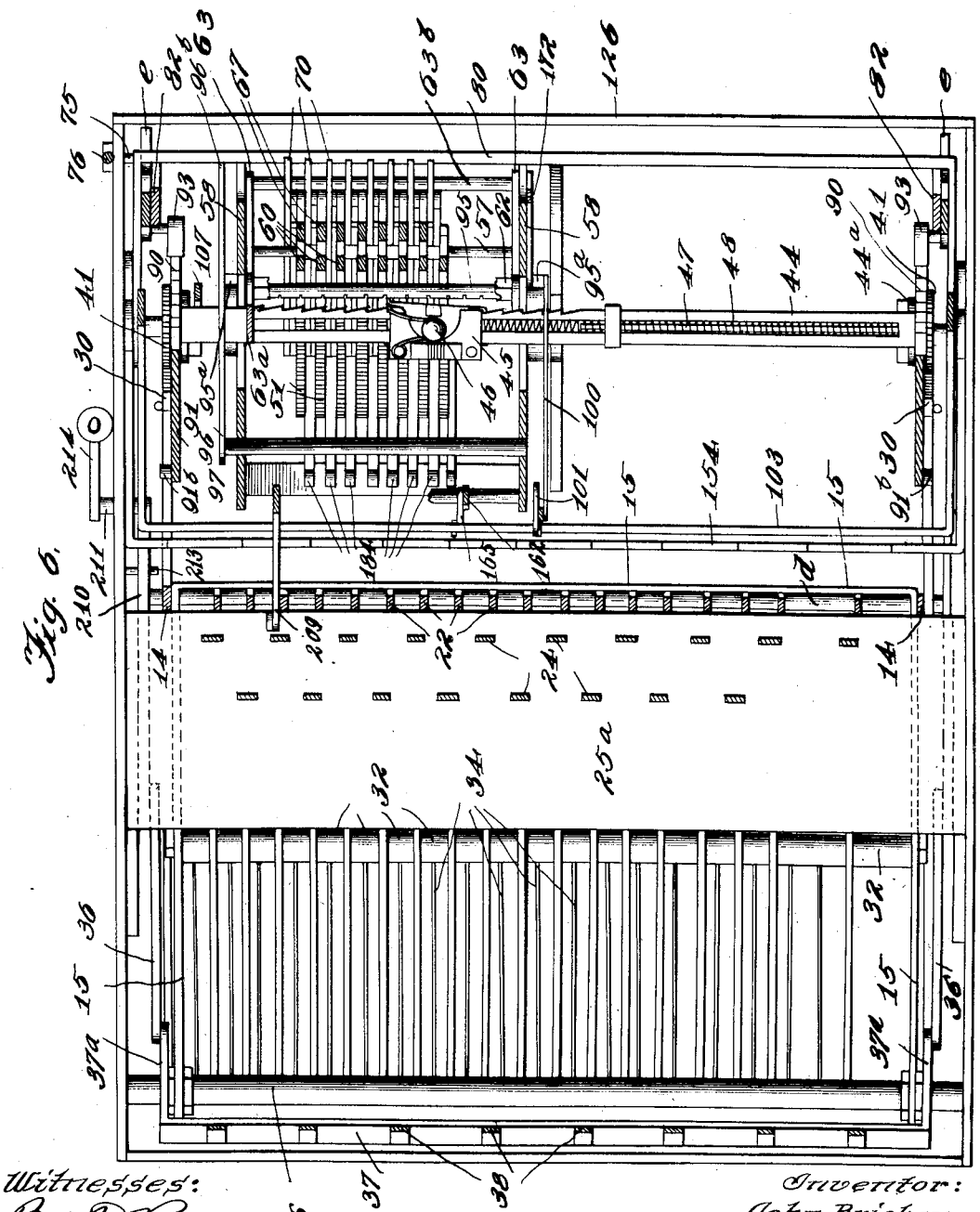

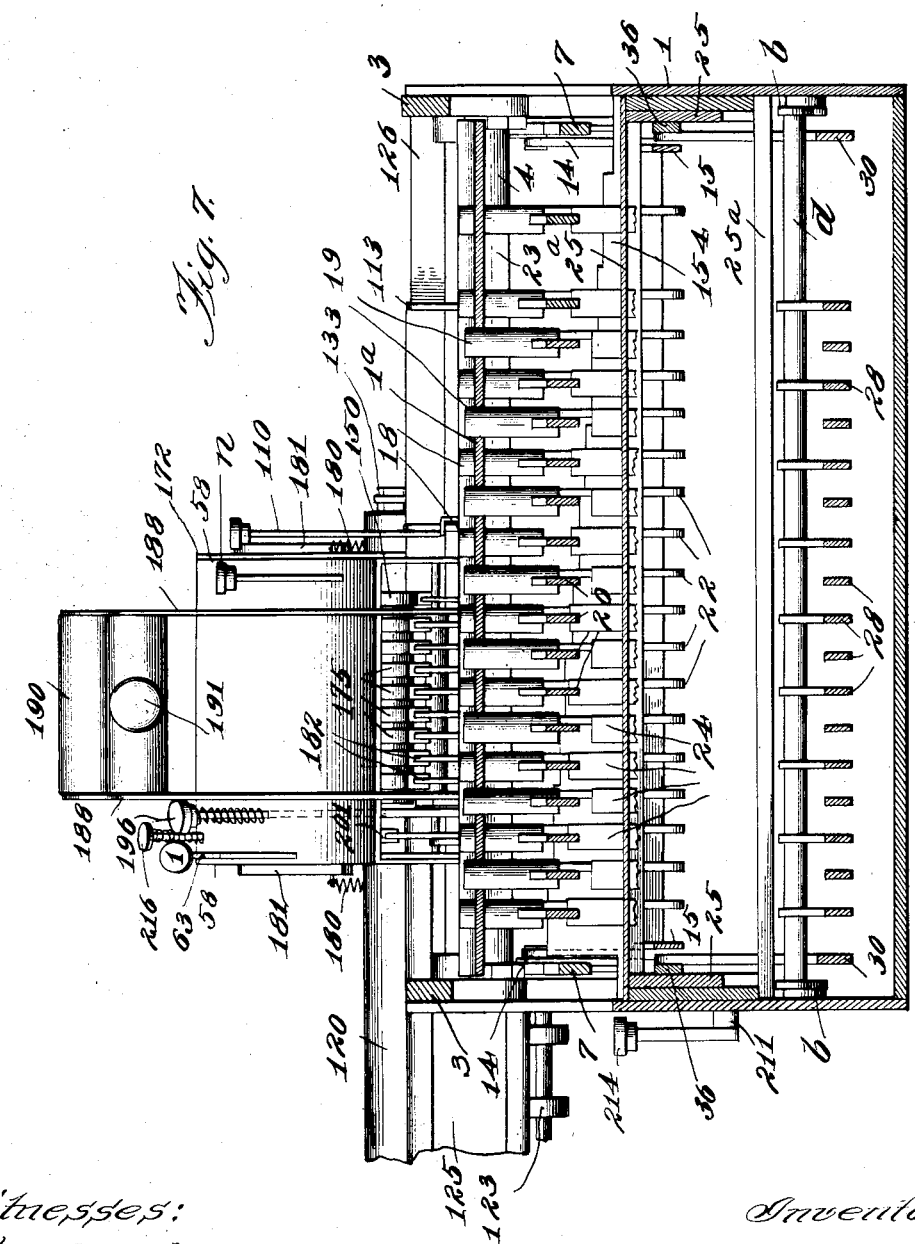

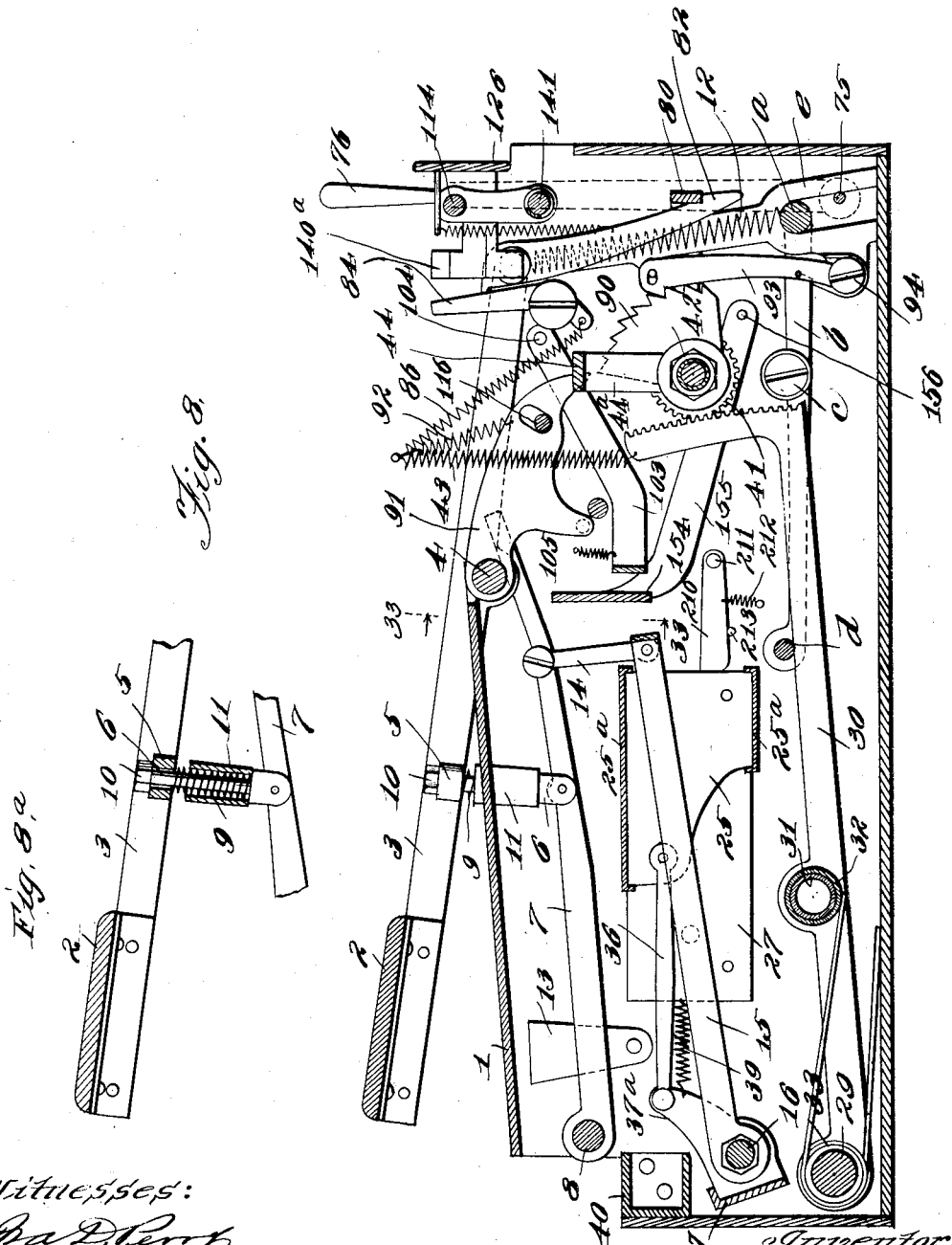

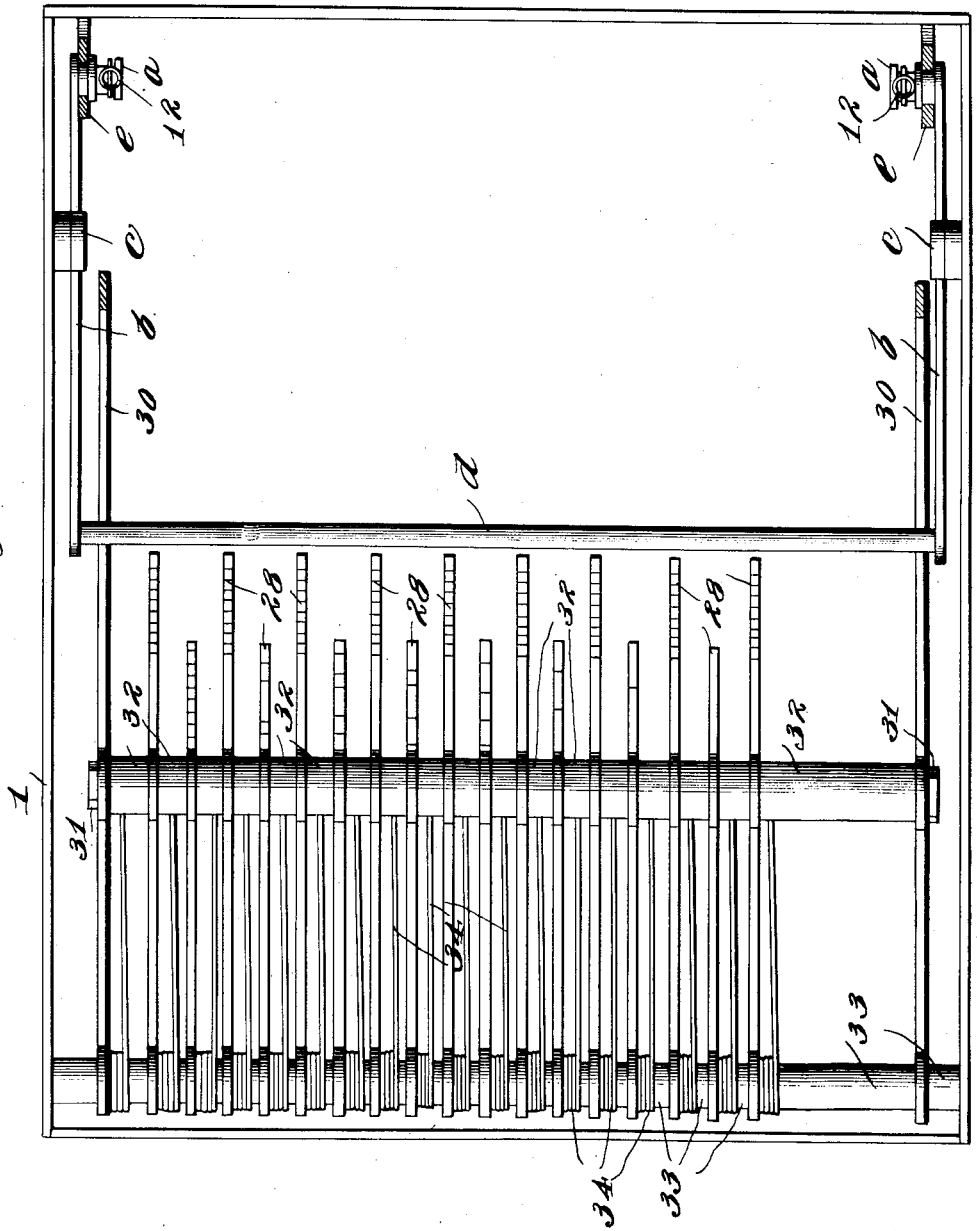

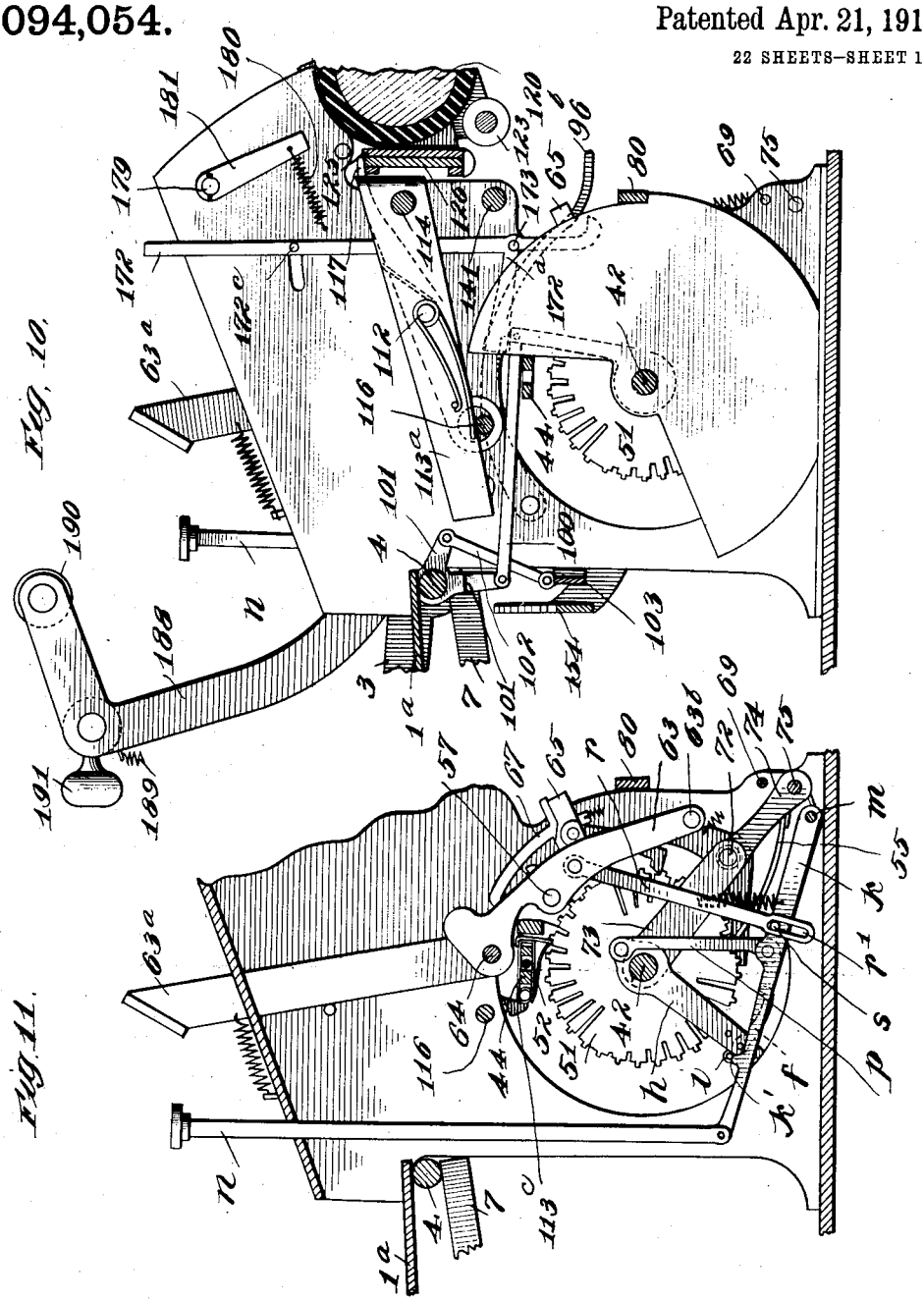

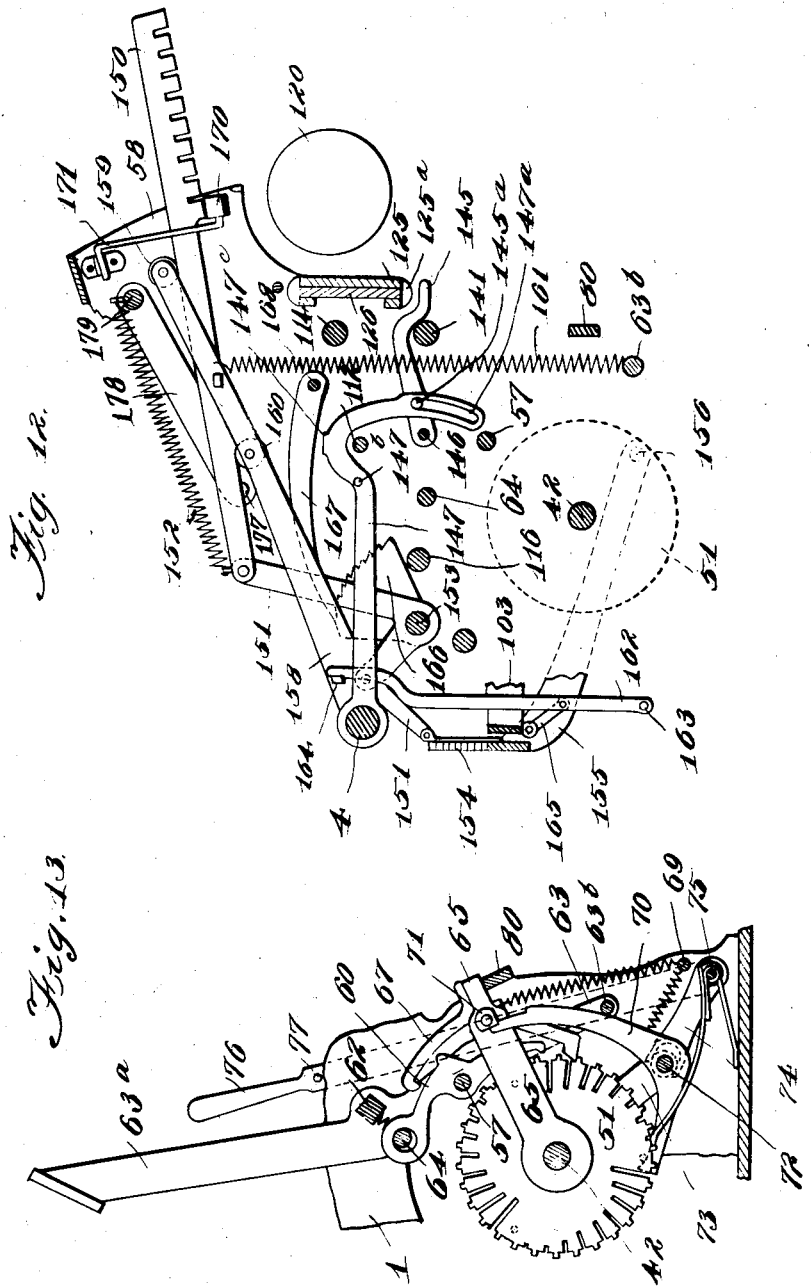

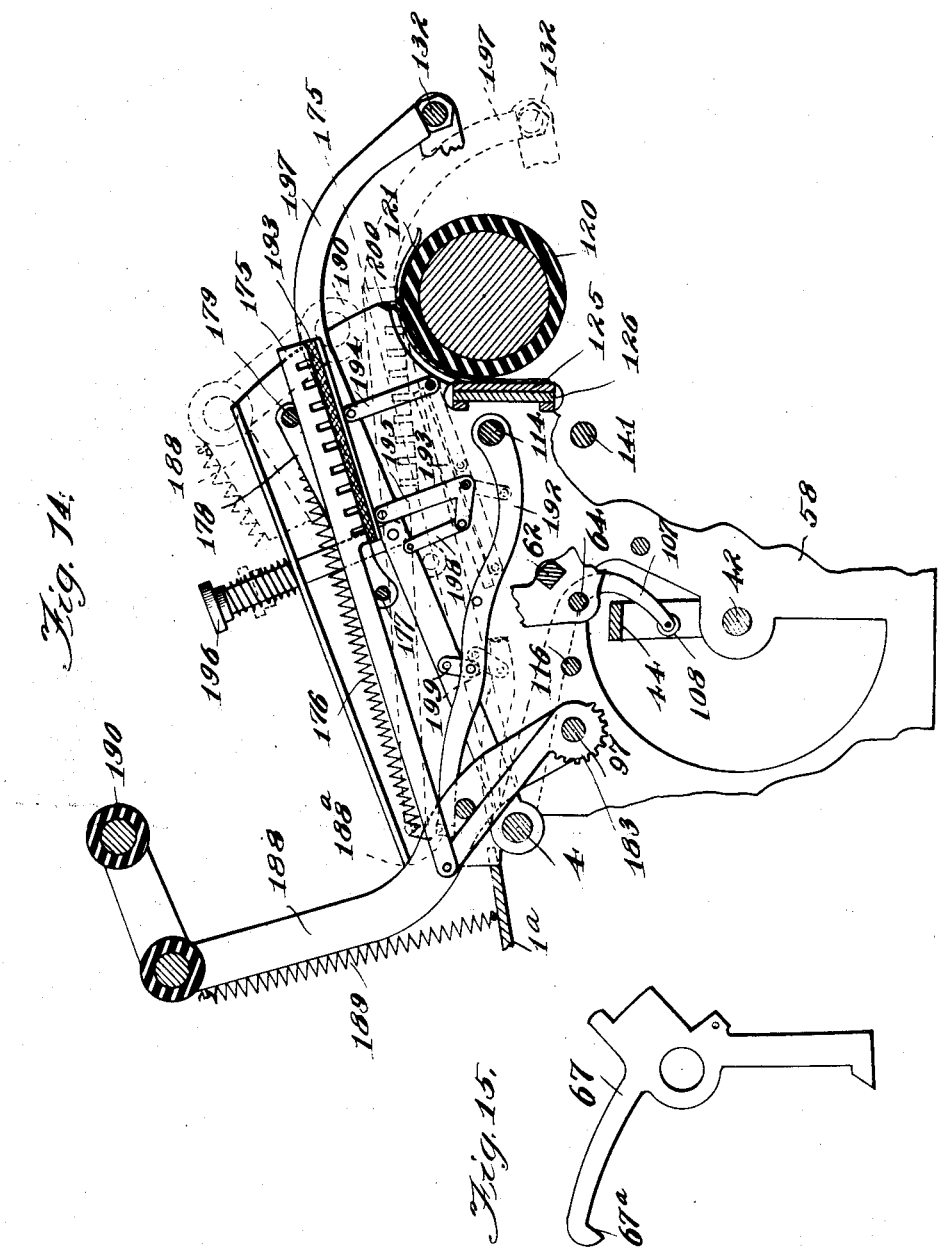

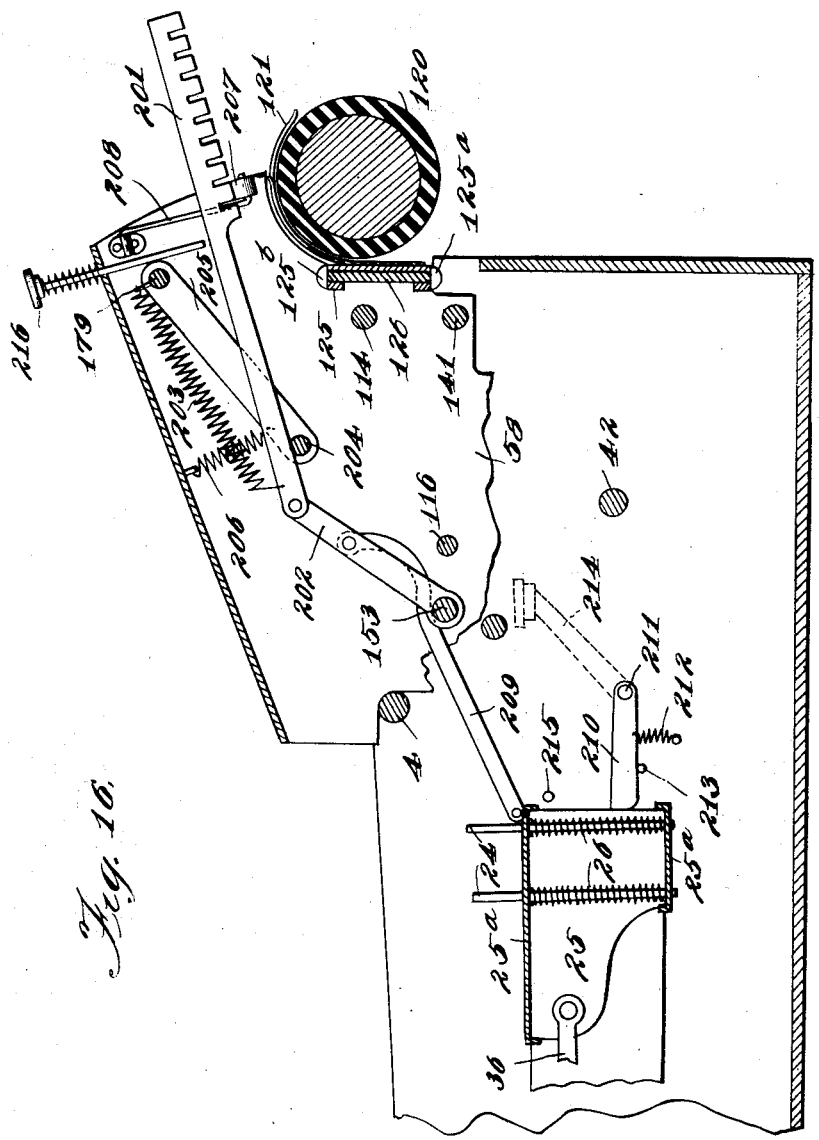

J. BRICKEN.
CALCULATING MACHINE.
APPLICATION FILED APR. 1, 1910.
1,094,054.
Patented Apr. 21, 1914.
22 SHEETS—SHEET 14.
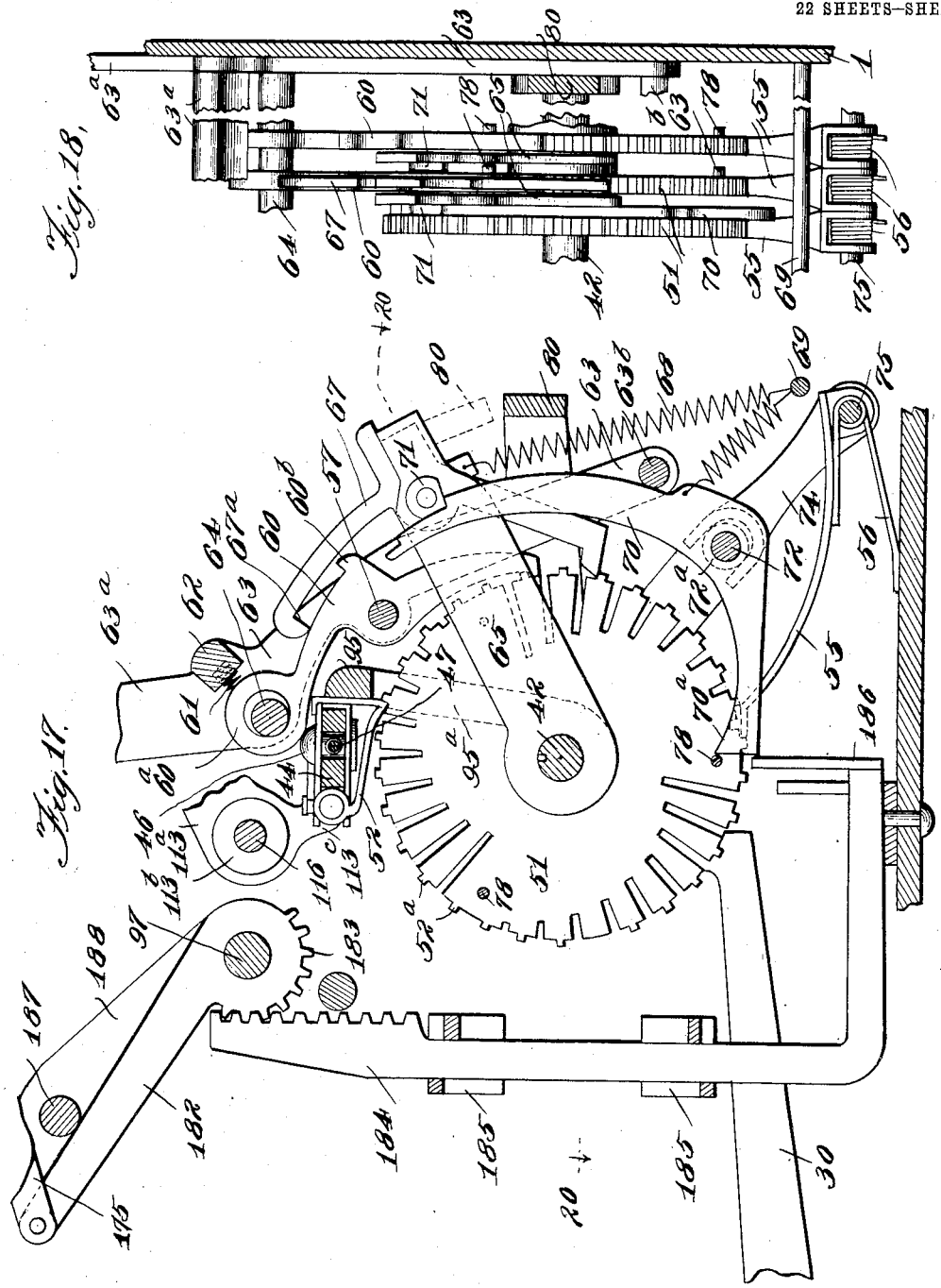
Witnesses:
Inventor:
John Bricken
By Cheever & Cox
Attys

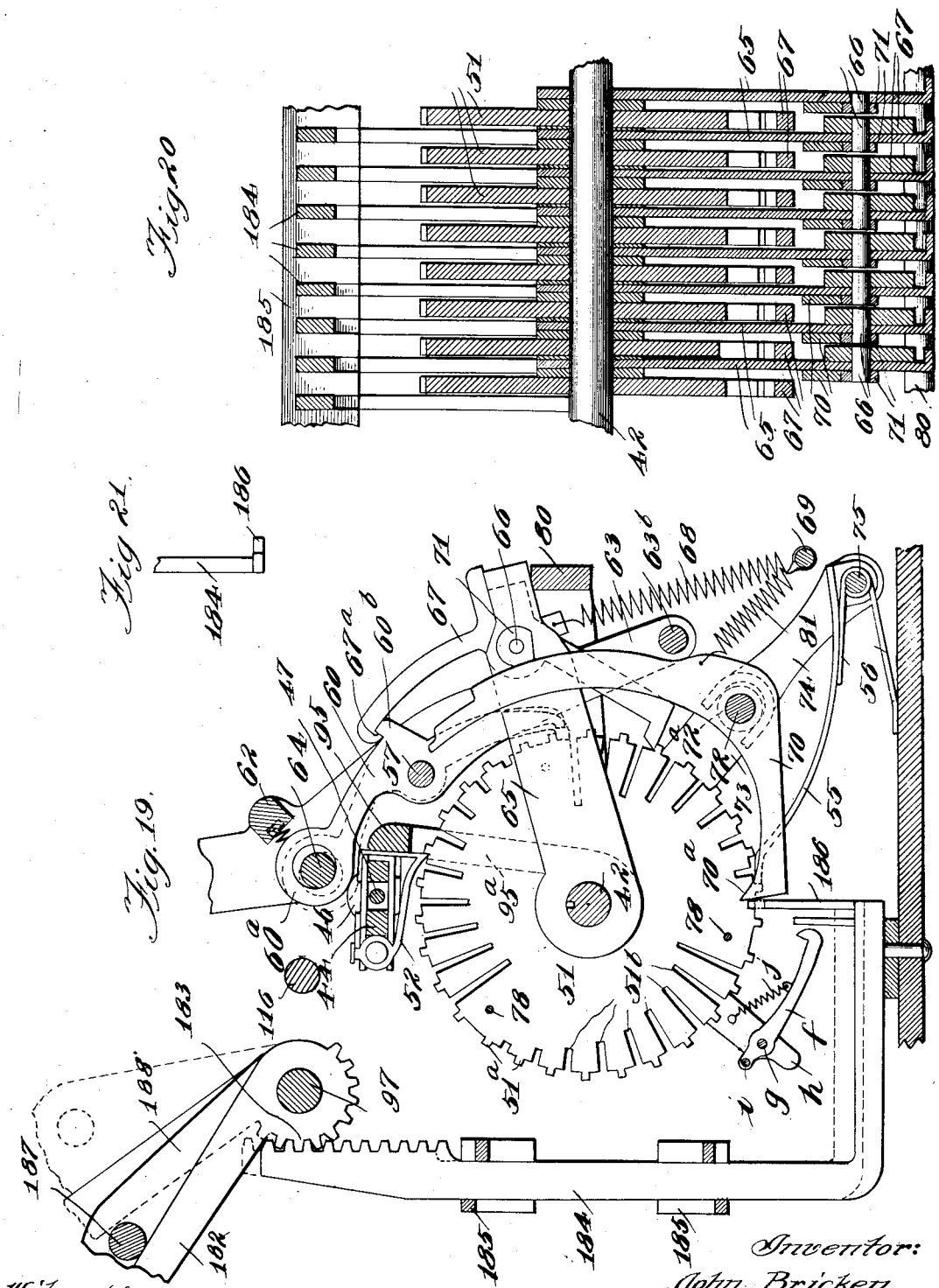

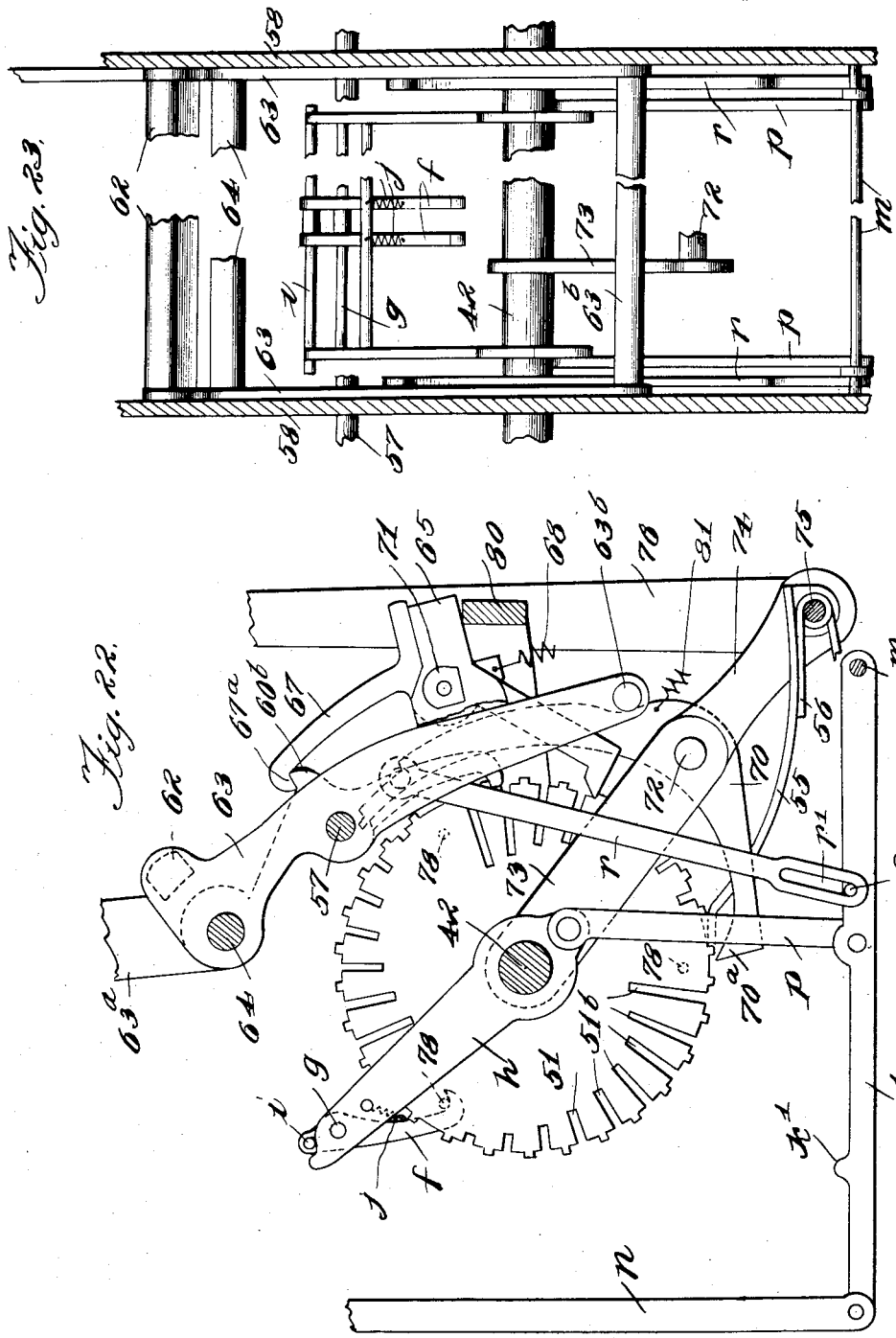

J. BRICKEN.
CALCULATING MACHINE.
APPLICATION FILED APR. 1, 1910.
1,094,054.
Patented Apr. 21, 1914.
22 SHEETS—SHEET 17.
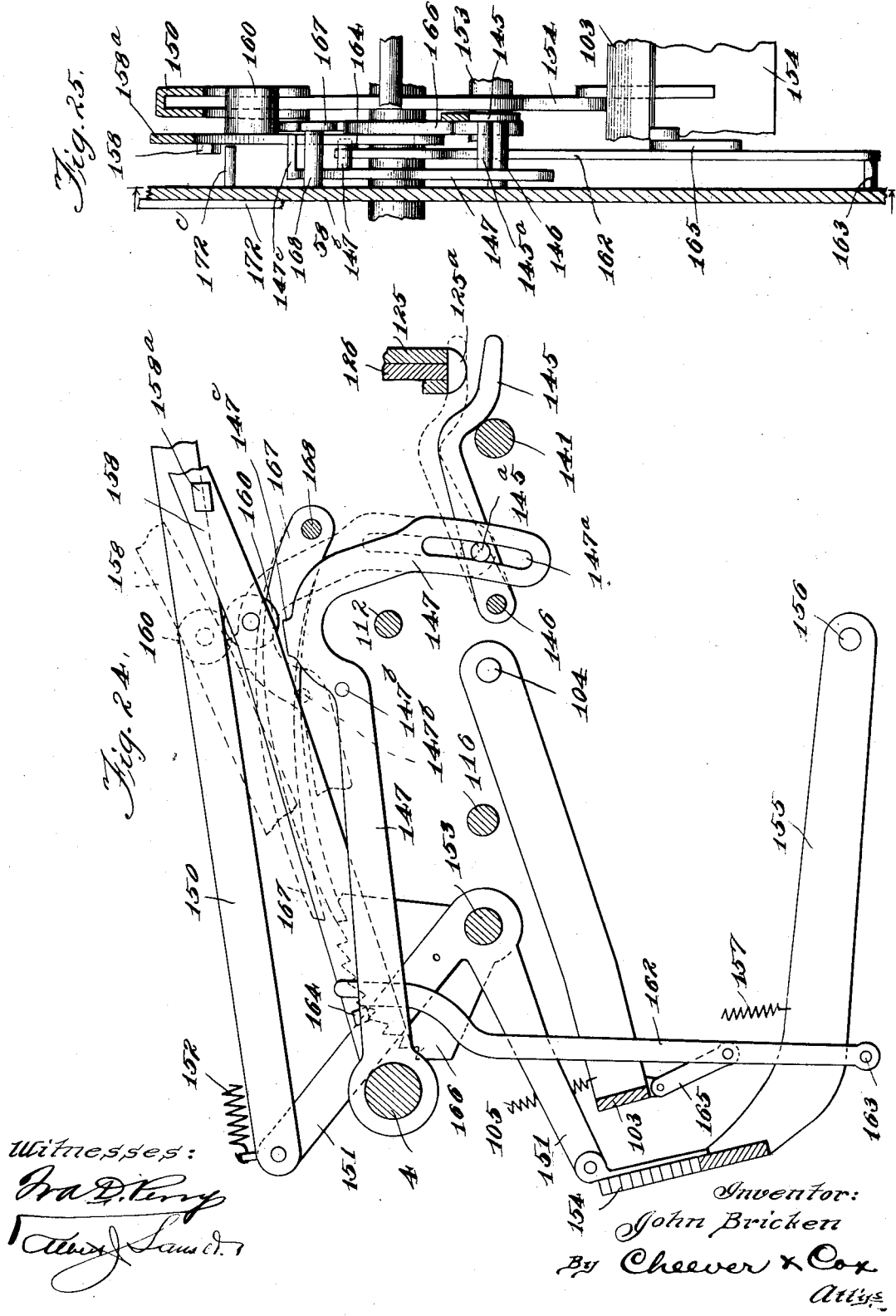

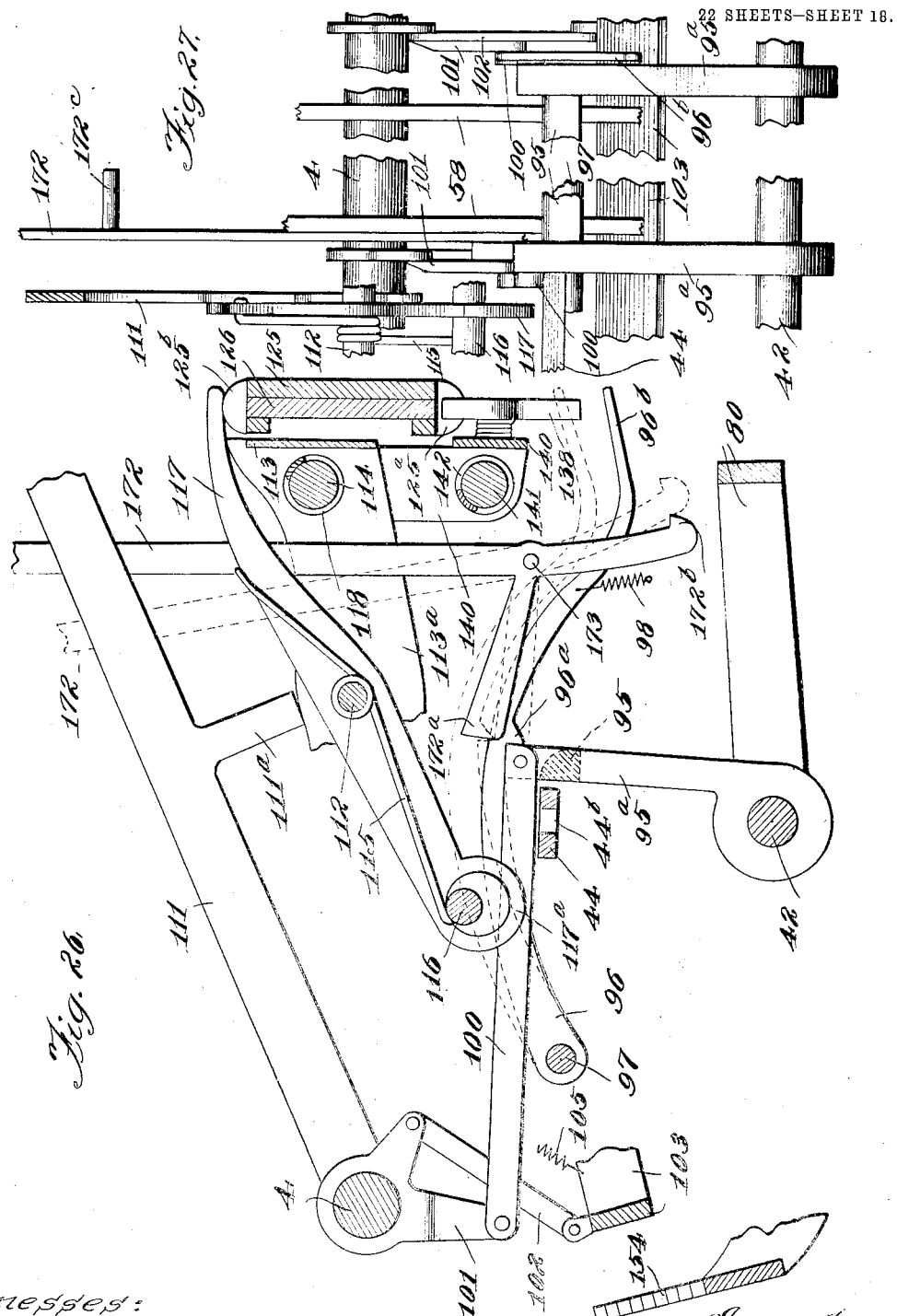

J. BRICKEN.
CALCULATING MACHINE.
APPLICATION FILED APR. 1, 1910.
1,094,054.  Patented Apr. 21, 1914.
22 SHEETS—SHEET 19.
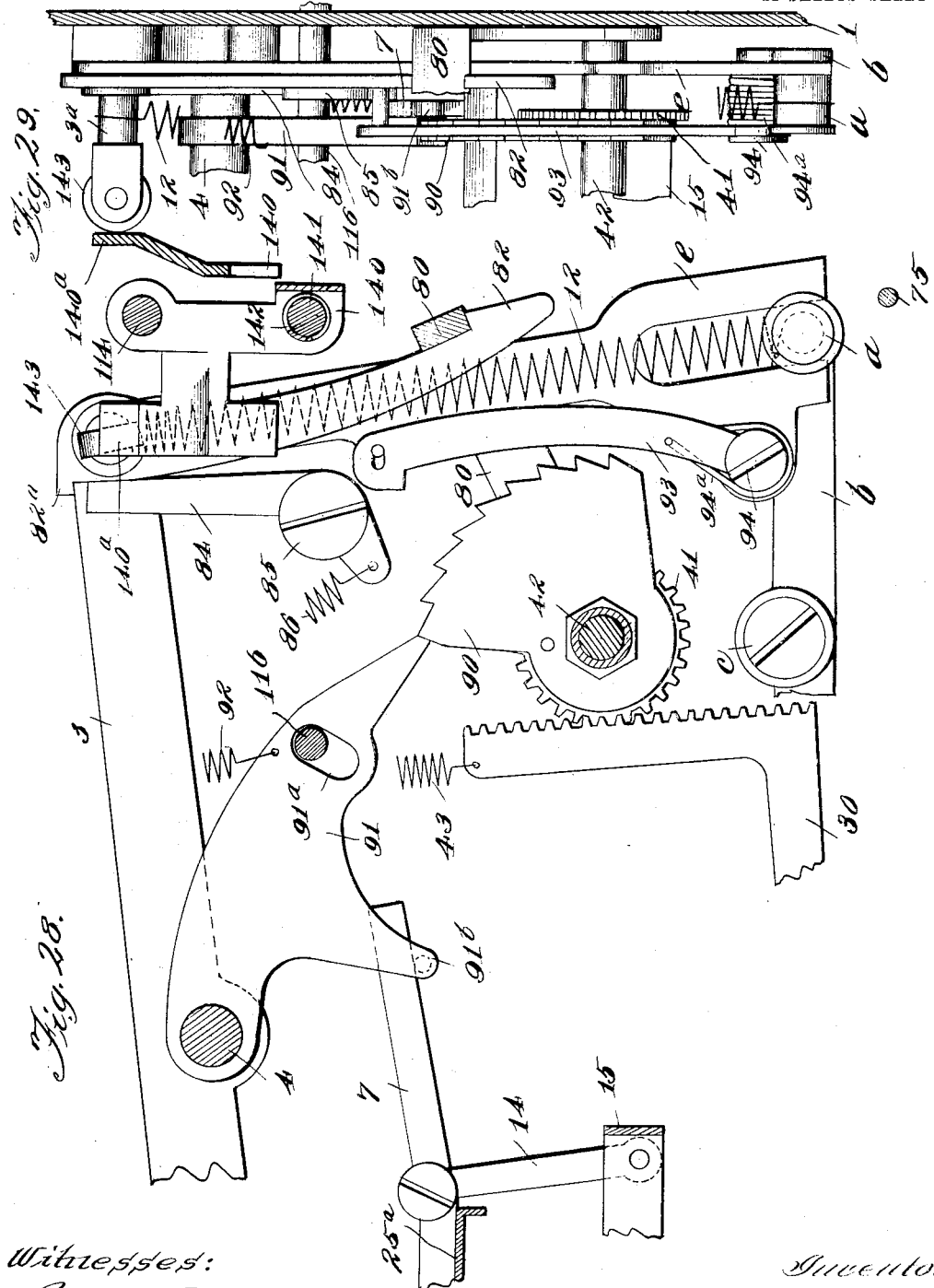

J. BRICKEN.
CALCULATING MACHINE.
APPLICATION FILED APR. 1, 1910.
1,094,054.
Patented Apr. 21, 1914.
22 SHEETS—SHEET 20.
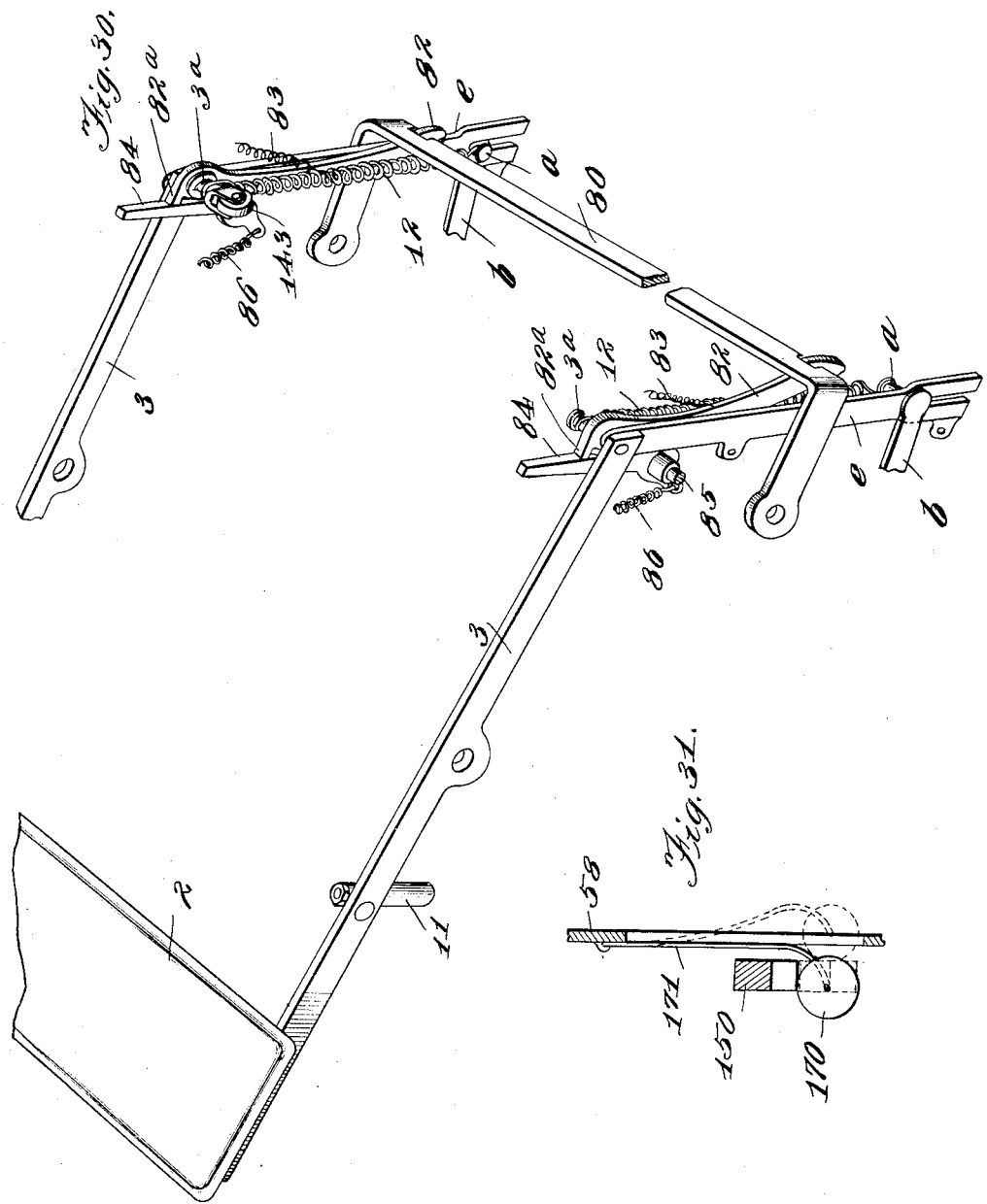
Witnesses:
Ira D. Perry
Abin J. Sauer
Inventor:
John Bricken
By Cheever & Cox
Attys

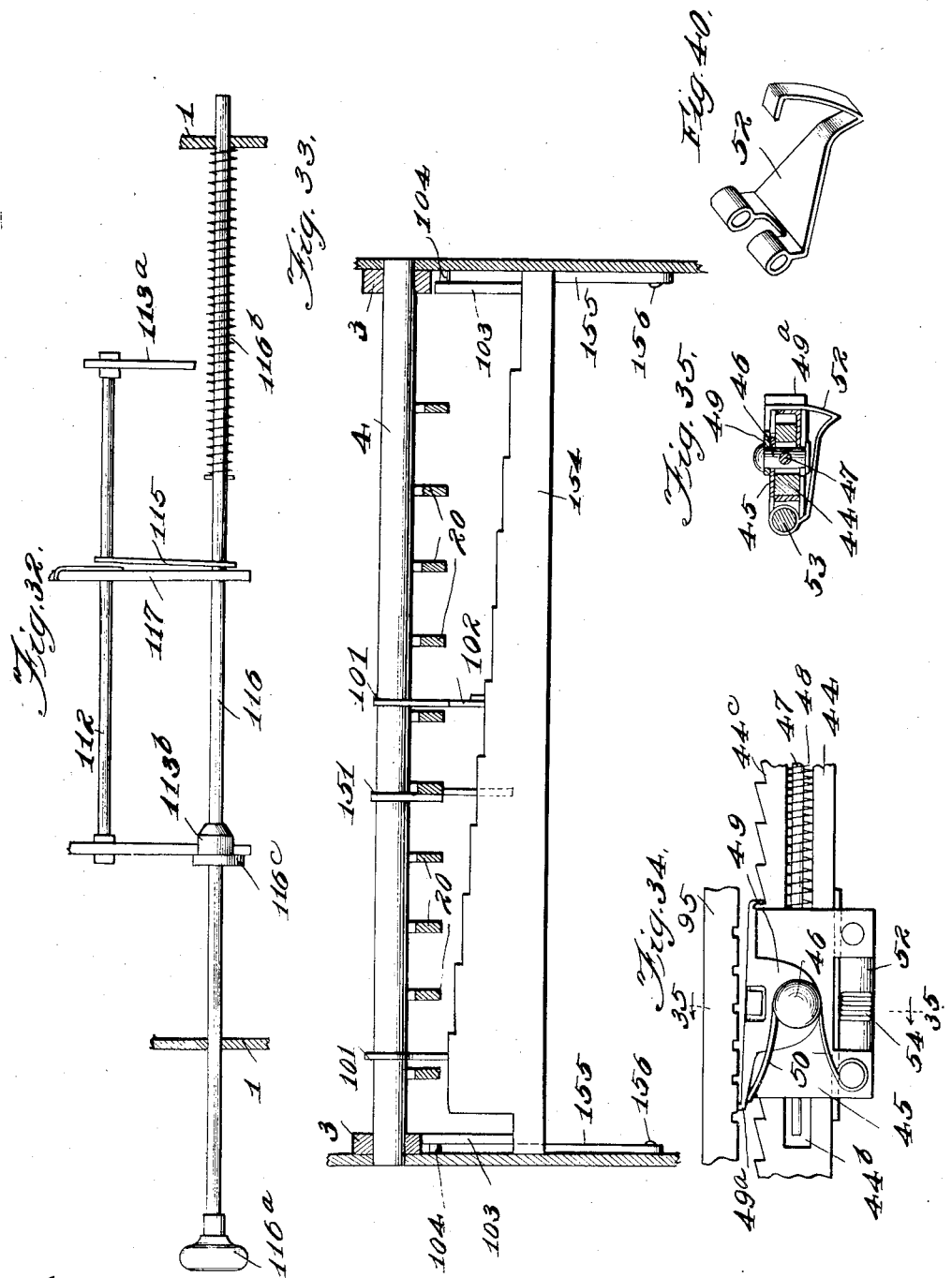

J. BRICKEN.
CALCULATING MACHINE.
APPLICATION FILED APR. 1, 1910.
1,094,054.
Patented Apr. 21, 1914.
22 SHEETS—SHEET 22.
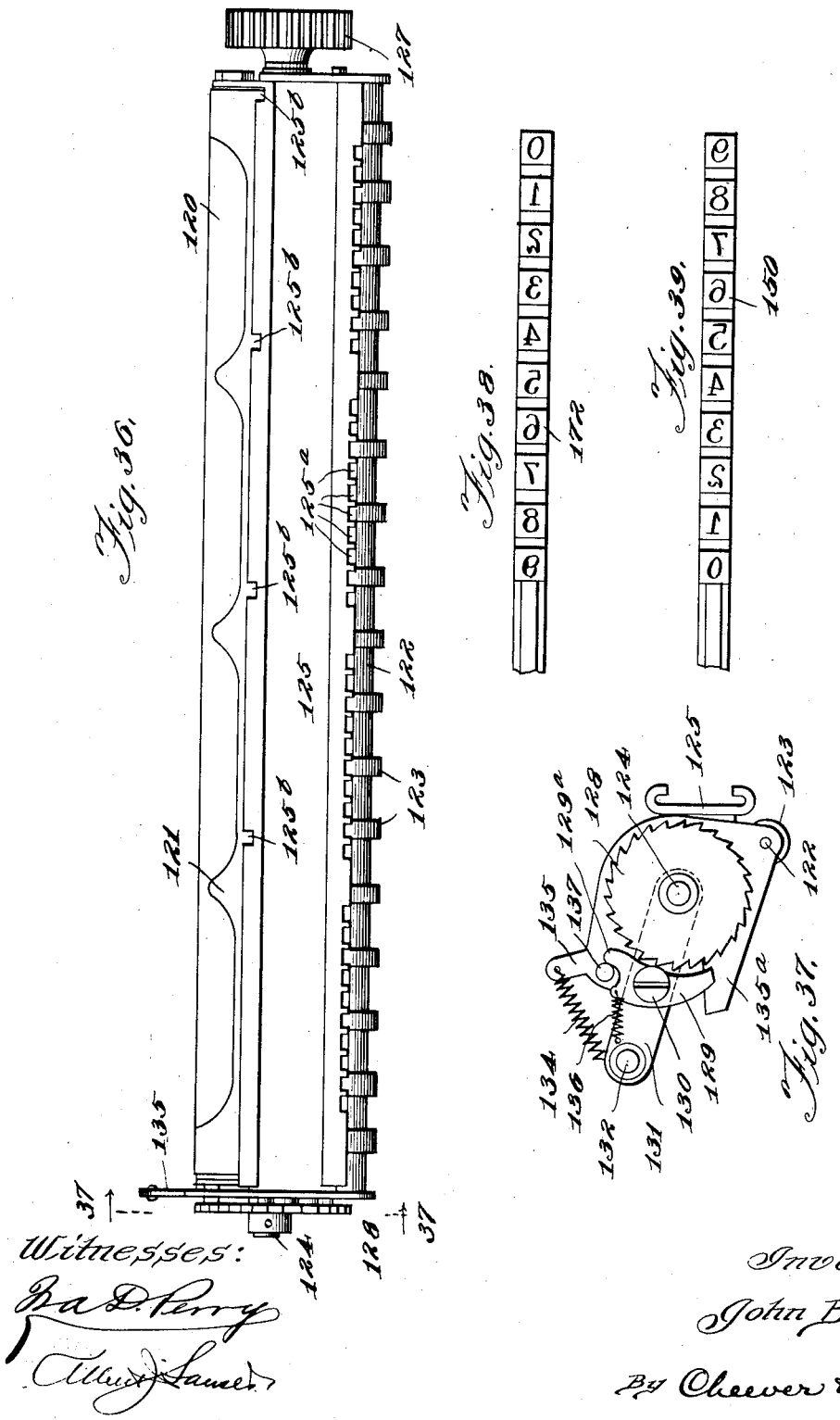

UNITED STATES PATENT OFFICE.

JOHN BRICKEN, OF CHICAGO, ILLINOIS, ASSIGNOR, BY DIRECT AND MESNE ASSIGNMENTS, TO BURROUGHS ADDING MACHINE COMPANY, OF DETROIT, MICHIGAN, A CORPORATION OF MICHIGAN.

CALCULATING-MACHINE.

1,094,054.  Specification of Letters Patent.  Patented Apr. 21, 1914.

Application filed April 1, 1910. Serial No. 552,843.

*To all whom it may concern:*

Be it known that I, JOHN BRICKEN, a subject of the Emperor of Russia, residing at Chicago, in the county of Cook and State of Illinois, have invented a certain new and useful Improvement in Calculating - Machines, of which the following is a specification.

My invention relates to calculating machines, and the object of the invention is to produce a simple, durable and reliable calculating machine, one especially adapted to perform multiplication and division.

Ancillary to this general object, it is my purpose to produce a number of detail mechanisms and to so combine and arrange them as to produce a new organization capable of carrying out the general objects above mentioned.

While the preferred mechanism for carrying out my object is hereinafter described in detail it will be understood that this particular mechanism is selected for the purpose of illustrating the invention and that various details and specific constructions may be modified without departing from the spirit of the invention.

Figure 1:
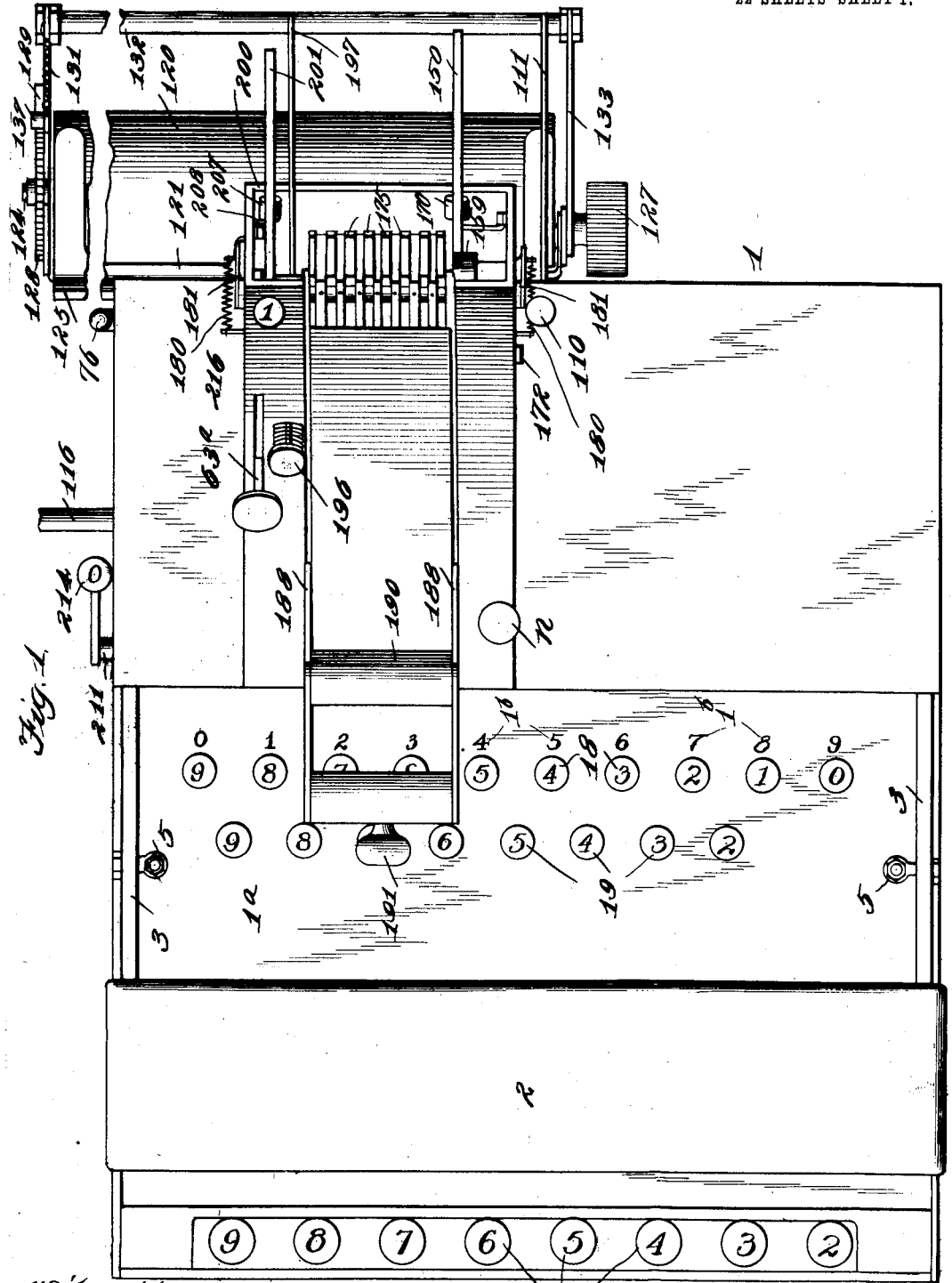
Figure 2:
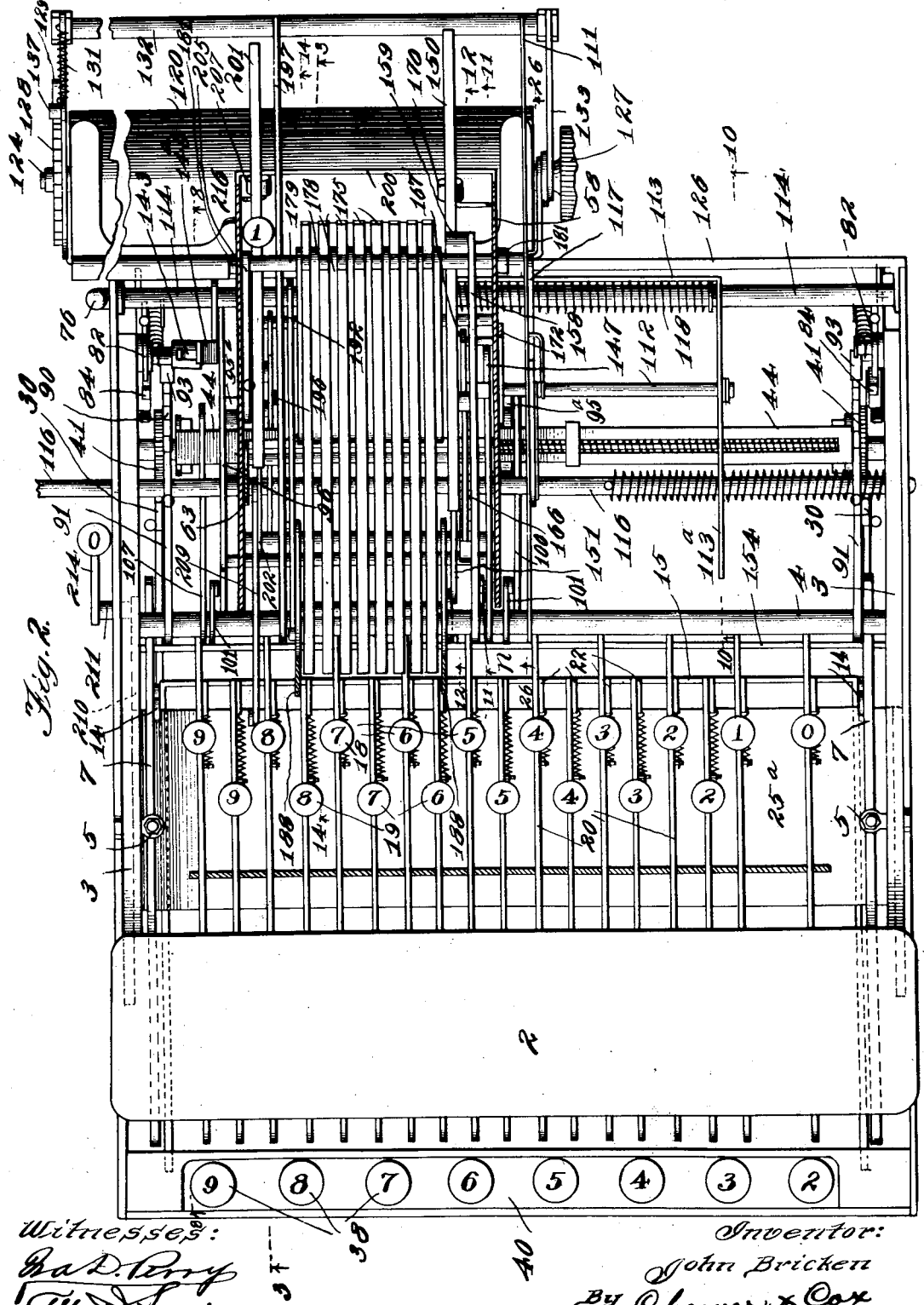
Figure 3:
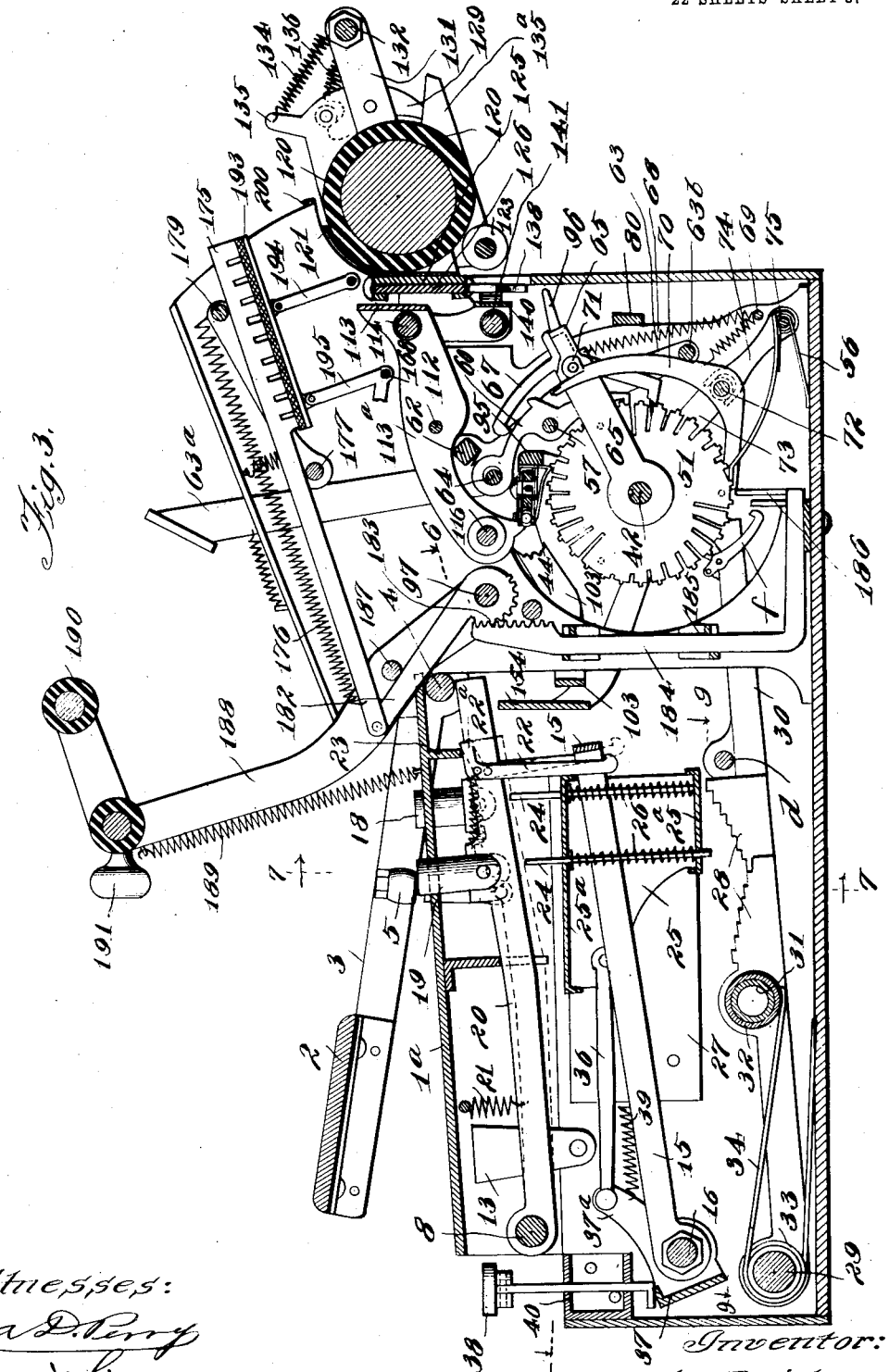

Figure 1 is a general plan view of the machine. Fig. 2 is a plan view of the machine with a portion of the cover removed. Fig. 3 is a sectional elevation on the line 3—3, Fig. 2. Fig. 4 is the same as Fig. 3 but showing a changed position of the parts. Fig. 5 is a rear elevation, the parts being broken away to reveal the operating mechanism. Fig. 6 is a sectional plan view taken on the irregular line 6—6, Fig. 3. Fig. 7 is a sectional elevation taken on the line 7—7, Fig. 3. Fig. 8 is a side sectional elevation on the line 8—8, Fig. 2. Fig. 8ᵃ is a detail showing the lost motion connection between the wrist lever and the intermediate lever. Fig. 9 is a plan view of the differential bars and toothed actuating segment taken on the line 9—9, Fig. 3. Figs. 10 to 14 inclusive are detailed sectional elevations taken respectively on the lines 10—10, 11—11, 12—12, 3—3, and 14—14 of Fig. 2. Fig. 15 is a detail of the carrying pawl. Fig. 16 is a detail of the multiplying type bar mechanism. Figs. 17 and 18 are enlarged side and end elevations respectively of the computing mechanism. Fig. 19 is similar to 17 but shows the parts in the position which they occupy when the carrying is completed. Fig. 20 is a sectional plan view taken on the lines 20—20 of Fig. 17. Fig. 21 is a plan view of the foot of the type-actuating rack. Fig. 22 is an enlarged detail of the parts shown in Fig. 11, this constituting the mechanism for resetting the computing wheels to zero position. Fig. 23 is an end elevation of the parts shown in Fig. 22. Fig. 24 is an enlarged detailed elevation of the parts shown in Fig. 12, these parts comprising the mechanism controlling the listing type bar. Fig. 25 is an end elevation of the parts shown in Fig. 24. Fig. 26 is an enlarged detail elevation on the line 26—26, Fig. 2. This is the mechanism which controls the denomination carriage. Fig. 27 is an end elevation of the parts shown in Fig. 26. Fig. 28 is an enlarged detailed elevation showing certain of the parts shown in Fig. 8. Fig. 28 shows mainly the stop pawl for the rocker bar and also the mechanism for resetting the carrying pawls. In Fig. 8 the parts are shown in normal position, and in Fig. 28 the parts are shown at the end of the operation of the mechanism for resetting the carrying pawls. Fig. 29 is an end elevation of the parts shown in Fig. 28. Fig. 30 is a detailed perspective view of the operating lever and mechanism for resetting the carrying pawls. Fig. 31 is a detail of the ink roller. Fig. 32 is a detailed sectional view of the bar for resetting the denomination carriage. Fig. 33 is a detailed sectional elevation taken on the line 33—33 of Fig. 8. This mechanism operates the listing type bar. Fig. 34 is an enlarged plan view of the denomination carriage and the rocker bar which supports it, and also the ratchet bar which holds the carriage during its period of rest. Fig. 35 is a detailed sectional view on the line 35—35, Fig. 34. Fig. 36 is a front elevation of the platen. Fig. 37 is an end view of the parts shown in Fig. 36, the view being taken in the direction of the arrows on line 37—37 of Fig. 36. Fig. 38 is an inverted plan view of one of the total type bars. Fig. 39 is an inverted plan view of one of the listing type bars. Fig. 40 is a perspective view of the driving pawl on the denomination carriage.

Similar reference characters refer to similar parts throughout the several views.

As a preliminary survey of the general mechanism and the theory upon which it is operated may be of assistance in understanding the principle of the invention and the various detailed mechanisms whereby the principle of the invention is carried out, I will first mention that the present machine is in certain respects analogous to and a development of the ideas shown in my two prior patents and in my copending application, to wit, Patents No. 938,550 dated November 2, 1909, and No. 943,514 dated December 14, 1909 and application Serial No. 530,136 filed November 27, 1909.

My present machine, while capable of addition and subtraction is especially adapted for multiplication and division. It has but two rows of figure keys, one row constituting the units figure keys, and the other row, the tens figure keys. In this respect the machine is similar to the ones shown in the above mentioned issued patents. Similarly, also, the units keys are ten in number and the tens keys are eight in number as required by the well known form of multiplication table illustrated for example in said Patent No. 938,550. The present machine is provided also with a set of factor keys as in said Patent No. 943,514. Said factor keys are eight in number and are used in multiplying to produce the required multiplying effect. In the present selected form of machine the figure keys do not actuate the computing mechanism but merely serve to connect the computing mechanism and parts of the printing mechanism with the power device, which, in the present instance is in the form of a broad transverse bar adapted to underlie the wrist or palm of the operator when the hand is in position to operate the figure keys. This bar will be referred to as the wrist bar and is operated by a downward movement of the wrist of the operator after the proper figure key has been depressed.

It will give some idea of the plan or theory of the machine to say that in case the operator wishes to multiply 32 by 6, e. g.

32
6
— he first depresses the factor key 6, say with his left hand, and while holding it down proceeds with his right hand as follows: with the finger of his right hand he depresses the 2 units key and, while holding it down depresses his wrist to operate the wrist bar. He then releases the key and bar and depresses the 2 tens key. While said key is held down he again depresses the wrist bar after which both the key and bar are released. The operator next depresses the 3 units figure key and then, while holding it depressed, again operates the wrist bar, after which both the key and wrist bar are released. He then depresses the 3 tens key and, while holding it depressed again operates the wrist bar and then releases said key and bar. This is all that is required to set up on the computing mechanism the required product of 32 multiplied by 6.

*The actuating mechanism.*—Proceeding now with the mechanism more in detail, the operating parts are, in general, supported and inclosed by a main framework or casing 1. The wrist bar 2 is supported upon two wrist levers 3 at the sides of the machine, said levers being fulcrumed upon the main fulcrum shaft 4, supported in the sides of the frame work 1. Said fulcrum shaft is rigidly secured to the levers and is therefore, rocked thereby, the purpose being to operate the zero lever 107 hereinafter described. On the sides of said wrist levers are eyes 5 loosely inclosing rods 6 as best shown in Figs. 3, 8 and 8ª. At the lower end said bars are articulately connected to intermediate levers 7 which are fulcrumed on the stationary shaft 8. Between said levers and the eyes 5 are interposed compression springs 9 through which a downward movement of the wrist levers is imparted to the intermediate levers. A nut or head 10 is formed on the upper end of each rod 6 above the eye 5 to limit the upward movement of the wrist levers. A sleeve or bushing 11 is also interposed between the wrist and intermediate levers around the spring 9 and rod 6, said sleeve being short enough to permit lost motion between the levers. The purpose of this lost motion is for releasing the resetting bar as will hereinafter appear.

The forward ends of the intermediate levers 7 underlie the main fulcrum shaft 4 which serves as a stop to limit their upward movement, although any other suitable mechanism may be provided for thus limiting their movements. The intermediate levers are normally held in raised position by the rods 6. The wrist levers 3 are normally held in raised position by the springs 12 shown in Figs. 8, 28, 29 and 30. The downward movement is limited by the stops 13 as well shown in Figs. 3, 4 and 8.

Springs 12 are attached at their upper end to studs 3ª carried by levers 3 and at their lower end to pins $a$, $a$ rigidly attached to two rocking levers $b$. This is clearly shown in Figs. 8, 9, 28, 29 and 30. Said levers are fulcrumed upon the stationary studs $c$ and extend toward the front of the machine, where they carry a cross bar $d$ which contacts the upper edge of the actuating segments 30 hereinafter mentioned. Segments 30 are urged to raised position by springs 34 and 43 hereinafter described, the resulting tendency being to hold the bar $d$ in raised position and to hold the studs $a$ down. As the studs are thus held down the tendency of the springs 12 is to hold the wrist bar 2 raised and the opposite ends of the wrist levers 3 down. The downward movement of the right end of the wrist levers (see Figs. 8 and 30) is limited by the stop legs $e$, $e$ which are articulately connected to the right end of said levers and extend down to contact the bottom of the casing, as shown in Fig. 8. The springs 34 and 43 are stronger than the springs 12 and thus overcome the latter and hold the wrist bar 2 normally in raised position, the motion being limited by said stop legs. The advantage of this construction, in which springs are opposed to springs, is that it equalizes the action of the wrist lever and eliminates the shock or jar which would otherwise occur as a result of the lost motion between key stems 24 and differential bars 28 hereinafter described. The lower end of legs $e$ are slotted in order to be guided by the studs $a$ in their vertical movement.

The intermediate bars 7, which in the present case are two in number, are located near the sides of the machine and are connected by a pair of links 14 to the actuator bar 15 as well shown in Figs. 3, 4, 6 and 8. Said actuator bar is U shaped when viewed in plan as in Fig. 6, the front of the bar extending horizontally across the machine and the two parallel rearwardly extending arms of said bar being fulcrumed upon the stationary shaft 16.

The mechanism thus far described in detail may be considered as the actuating or power furnishing mechanism. I will next describe the key connections and differential mechanism.

In this machine the figure keys serve to throw the proper members of the differential mechanism into connection with the source of power, to wit, the wrist bar 2 and actuator bar 15 which is operated thereby. The units figure keys 18 and tens figure keys 19, best shown in Figs. 1, 2, 3, 4 and 7 are guided in their vertical movement by the key board $1^a$ which forms a part of the frame work of the machine. Complementary figures $1^b$ are marked on the key board adjacent to the units figure keys 18 as shown in Fig. 1. Each of said keys is articulately connected to a key lever 20, said levers being fulcrumed upon the shaft 8. Each key lever is normally held in raised position by means of a spring 21. The units key levers are longer than the tens key levers, the reason for this being hereinafter pointed out.

To each key lever is pivotally suspended a hook 22, the hooked end whereof is adapted to swing into and out of engagement with the cross piece of the actuator bar 15. Said hooks are spring influenced to swing toward said cross piece to be engaged thereby as shown in Fig. 4. When the key levers are up in normal position, as shown for example in Fig. 3, the hooks are normally held out of engagement with the actuator bar by means of a stationary stop 23 extending down from the key board. This stop engages arms $22^a$ on said hooks to hold the latter in non active position. The parts are so proportioned that as soon as a key lever commences to descend the arm $22^a$ on the attached hook will be released, permitting the hooked end to swing into the path of the actuator bar 15 so as to be engaged thereby as soon as said bar commences to descend. This condition is shown in Fig. 4. It will be noted that as soon as the actuator bar has engaged any particular hook it will hold it in engagement during the rest of the downward, and an equal part of the upward stroke. The result of this is that the operator does not require to exercise care to see that his finger remains upon the figure key during the entire action of the wrist bar, for the parts will themselves remain in engagement as soon as the engagement has once taken place.

Under each key lever is a key stem 24 as shown in elevation in Figs. 3 and 4, and in plan section in Fig. 6. Said key stems consist of vertically movable rods which are guided in their vertical movement by the upper and lower plates $25^a$ of the factor carriage 25. Said stems are normally held in raised position by means of springs 26. Said carriage 25 is horizontally movable, being supported and guided by the stationary ways 27. In the path of descent of each of the key stems is a differential member 28, here shown in the form of separate bars, pivoted upon the stationary shaft 29. Each differential bar has a number of different points of actuation where it can be contacted by and depressed by its respective descending key stem. Differential bars of this general character have been described in my previous patents above mentioned, and it is sufficient here to say that they are so proportioned and designed as to produce different amounts of movement in the computing mechanism depending upon the value of the key depressed.

The differential members are all connected to the actuating segments 30 in such manner that when any differential member is depressed it will cause a corresponding amount of depression in said actuating segments. In this, the preferred design, there are two of these segments, one on each side of the machine, said segments being fulcrumed upon the shaft 29 and being rigidly connected to the differential members by means of a cross tube 31 which extends from one segment to the other through the differential members, the parts being properly spaced by interposed sleeves or distance pieces 32, as shown for example in Figs. 3, 4, 8 and 9. By preference the parts are also spaced in the same way on the shaft 29 by sleeves or distance pieces 33. The differential members and actuating segments are normally held in raised position by means of springs 34.

I will now describe the factor keys and parts operated thereby.

*Factor keys and connected parts.*—The purpose of the factor keys is to shift the key stems to the proper positions so that said stems will contact the proper point of actuation on the differential members. As above mentioned the stems are mounted so as to reciprocate vertically in the horizontally shiftable carriage 25. Said carriage is controlled by links 36, one at each end of the machine as shown in plan in Fig. 6, and in side elevation in Figs. 3, 4 and 8. At one end these controlling links are articulately connected to the carriage and at the other end to the arms 37$^a$ of the factor bar 37. Said arms are adapted to rock upon the shaft 16. The bar 37 extends across the machine in position to be contacted and depressed by the factor keys 38. Said bar is normally held in raised position by means of springs 39, said springs in the present case being attached at one end to the arms 37$^a$, and at the other end to the carriage guide 27 or some other stationary part of the machine. The factor keys are arranged in a transverse row at the front of the machine and are guided in their vertical movement by a stationary guide 40, which forms part of the frame work of the machine. The parts are so arranged that under normal conditions the factor carriage will occupy the position shown in Figs. 3, 4, 8 and 16, which corresponds to the "1" factor. In other words, when the carriage is in normal condition the multiplying factor will be unity and the machine will be in the condition for straight addition or subtraction. When the "2" factor key is depressed it will shift the carriage forward to a position where the key stems will produce twice as great an effect in the computing mechanism. Similarly, the "5" factor key will produce five times as great an effect, etc., the factor keys, therefore, coöperating with the rest of the mechanism to produce multiplication.

I will now describe the computing mechanism.

The actuating segments 30 above mentioned are provided with teeth adapted to mesh with pinions 41 mounted so as to rotate freely upon the stationary shaft 42 as shown for example in Fig. 8, and in detail in Figs. 28 and 29. Springs 43 coöperate with the springs 34 to hold the segments in raised position and to rotate the said pinions in a clockwise direction when viewed from the right side of the machine. Said pinions are pinned or otherwise rigidly secured to the radially extending arms 44$^a$ of the oscillating bar 44, with the result that the up and down movement of the segments 30 will produce an oscillatory movement of the said bar 44 about the shaft 42 as a center. Said bar extends transversely to the computing wheels and serves as a guide or track along which the denomination carriage travels. The relation of these parts is well shown in Fig. 6.

The denomination carriage is shown in detail in Figs. 34, 35 and 40 and consists of a body portion 45 adapted to slide upon the bar and carrying the post 46. Said post passes through the slot 44$^b$ which extends longitudinally in bar 44. Said post is horizontally apertured to accommodate the rod 47 which extends lengthwise in the slot 44$^b$. Said rod serves as a core or stiffener for the helical spring 48 which surrounds it. Said spring bears at the right end against the right end of the slot and bears at the left end against said post 46. Spring 48 is a compression spring and, therefore, exerts a constant tendency to shift the denomination carriage toward the left, that is, from a lower to a higher order or denomination. The bar 44 has ratchet teeth 44$^c$ adapted to be engaged by an escapement dog 49 which is pivoted upon the post 46 and is adapted to engage said ratchet teeth to normally prevent spring 48 from moving the carriage toward the left. The dog is normally held in acting position by a spring 50.

The function of the denomination carriage is to rotate the computing wheels 51 shown in detail in Figs. 17, 18, 19, 22 and 23. In the present construction the computing wheels always rotate forward (clockwise, when viewed from the right side of the machine); never backward, even in resetting to zero. Said wheels are loosely mounted upon the shaft 42 above mentioned, the construction being such that said wheels are independently rotatable around said shaft but are not laterally movable. The computing wheels are rotated in a forward or clockwise direction by a driving pawl 52 shown in perspective in Fig. 40. Said pawl is pivoted upon a shaft 53 on the denomination carriage and is acted upon by spring 54 acting in such direction as to force the nose of the pawl toward the teeth 51$^a$ projecting from the computing wheels. The arrangement is such that when the oscillating bar 44 and the denomination carriage move in a forward or clockwise direction, they will produce an equal amount of rotation of the computing wheel with which the pawl may be engaged at the time, but when said pawl and denomination carriage rotate backward in an anticlockwise direction said pawl will drag over the teeth 51ª without rotating said computing wheel. The computing wheels are each provided with detaining pawls 55 for preventing them from rotating backward, these detents being urged toward the wheel by springs 56 as shown for example in Figs. 17, 18 and 19.

*Overthrow device for oscillating bar and denomination carriage.*—I will now describe the device for preventing the oscillating bar and parts thereon from rotating too far as a result of the down stroke of the actuating segments. Rigidly secured to each of the driving pinions 41 at the side thereof, is a circular ratchet 90, the toothed portion whereof is connected with the shaft 42 as shown in Figs. 8, 28 and 29. The teeth of said ratchets are so faced that when they are engaged by the pawls 91 they will be arrested by said pawls and will arrest the pinions 41 and oscillating bar 44. A pawl 91 is provided for each of the ratchets 90, said pawls being loosely pivoted upon the shaft 4. The slots 91ª are here formed in the pawls merely for the purpose of non interference with the stationary rod which passes through them. There is no special coöperation between these parts. The pawls are normally held in raised position, clear of the teeth of the ratchets 90 by springs 92. These pawls are thrown down into engagement with the ratchets at the proper time by the ends of the intermediate levers 7 which engage pins 91ᵇ extending from the side of the pawls as indicated in dotted lines in Fig. 28. The proper time of engagement to arrest the ratchets and oscillating bar is determined by the amount of lost motion between the key stems and the differential bars. The amount of lost motion is equal to the practical complement of the differential bar operated. I may here explain that for the purpose of describing and claiming my present invention I will distinguish between a "true" complement and a "practical" complement, and will define as true complements two figures which, when added together make 10, and as practical complements two figures which, when added together make 9. In my machine the intermediate levers 7 always move the same distance and the key stems always move the same distance, but the differential bars 28 have a movement corresponding to the amount of movement to be imparted to the computing wheels. Thus the key stems always move the equivalent of nine spaces, while the differential bars move different amounts depending upon their individual values, and where for example a differential bar is to produce a rotation of seven spaces in the computing wheel there will be a lost motion of the equivalent of two spaces between the differential bar and key stem which operates it. The pawls 91 are always thrown into action just prior to the completion of the ninth space. The lost motion, therefore, occurs at the beginning of the stroke of the key stem. Ratchets 90 do not commence to rotate until the key stem has contacted the differential bar and, therefore, there will be only as much rotation of the ratchet as is called for by the differential bar operated. For example, if the bar is to produce a rotation of seven spaces in the computing wheel there will be a lost motion of two spaces, after which the differential bar will be contacted and the ratchets 90 will commence to rotate and the ratchets will rotate seven spaces before they are arrested by the pawls. Rebound of the ratchet 90 is prevented by rebound pawls 93, best shown in Figs. 8 and 28. These pawls are pivoted upon the studs 94 carried by the stop legs $e$ and are urged toward said ratchets by means of the springs 94ª. It will thus be seen that the rebound pawls move vertically with the wrist levers 3 and legs $e$ so as to come into action each time the wrist bar is operated.

*Overthrow device for computing wheels.*— I provide an overthrow device for overcoming the effects of inertia in the computing wheels when they are rotating forward, the purpose being to provide a positive stop adapted to arrest any given computing wheel as soon as it has been rotated the proper amount. This mechanism is shown in detail in Figs. 17, 18, 19, 20, 22, and 23. A fulcrum shaft 57 is rigidly mounted in a horizontal position transverse to the computing wheels, being supported by two stationary wall plates 58 best shown in Fig. 6. Fulcrumed on said shaft 57 are arresting pawls 60. There is one of these pawls for every computing wheel and they are independently rotatable upon said shaft. On one end of each pawl is a nose adapted to engage the pins 52ª on the associated computing wheel to prevent the wheel from rotating in a clockwise or forward direction. These pawls are normally held out of engagement by a number of individual compression springs 61, which are interposed between the pawls and the transverse bar 62. Said bar is supported at the ends by two rocking frames 63 located just inside the walls 58 and fulcrumed on shaft 57. This is clearly shown in Figs. 22 and 23. A shaft 64 also extends from one of the rocking frames 63 to the other and is rigidly secured thereto to cause both frames to rock in unison. On each arresting pawl is formed an eye 60ª through which shaft 64 penetrates. As shown in Figs. 17 and 19, the eyes of the pawls are larger than the shaft and hence there is a limited amount of play between them.

As above mentioned, the arresting pawls are normally held out of engagement with the computing wheel by the springs 61. They are thrown into engagement one at a time by means of the head of the post 46 of the denomination carriage. This head acts as a kind of cam and does not come into action until the driving pawl is returned to normal or zero position as shown in Figs. 17, 19 and 22. It will be understood that in my machine the oscillating bar 44 normally remains at the zero position and when the actuating segments 30 descend the result is merely to drag the driving pawl backward over the computing wheel the proper number of spaces. The forward or positive rotation of the computing wheel is not produced by the actuating segments but by spring mechanism which returns the driving pawl with the oscillating bar 44 to normal position. In other words, the actuating segments serve to drag the driving pawl backward the proper number of spaces, and the forward movement is produced by certain spring mechanism which acts afterward. The post 46 acts upon the particular computing wheel which is at the time being operated by the driving pawl 52 and as said post does not come into action until normal position is reached, the pawl will not engage the wheel until said wheel has rotated the proper amount. It becomes necessary for addition or subtraction to lock the computing wheels, and this is done by the arresting pawls 60, which are thrown into engagement by rocking the frame 63 in a clockwise direction by the handle 63ª, located in the present instance at the left side of the machine. When the rocking frames are rocked in a clockwise direction they cause the rod 64 to contact the arresting pawls in such manner as to throw the latter into engagement.

I will now describe the carrying action of the computing mechanism.

Located at the side of each computing wheel 51 is a carrying arm 65, shown in detail in Figs. 17, 18, 19 and 20. These carrying arms are loosely mounted upon the shaft 42 and each carries a pivot pin 66 whereon is loosely mounted a carrying pawl 67. There is thus a carrying pawl for each of the computing wheels. The lower end of each carrying pawl is so formed as to engage the teeth 51ª on the computing wheels to rotate the same forward one step when a carrying action is to take place. Each carrying pawl has a spring 68 secured to it in such manner as to perform the double function of holding the pawl in engagement with the teeth, and rotating the pawl and engaged computing wheel in a forward direction to produce the requisite carrying action. As best shown in Figs. 17, 18 and 19, the lower end of springs 68 are secured to a stationary cross rod 69. It will be apparent that the tendency of the springs 68 is to rotate the arms 65 in a forward direction and also the carrying pawls 67, for the two are pivotally connected together. Said arms and pawls are normally held from rotating by detaining pawls 70, which are so formed at their upper end as to engage lugs 71 rigidly secured at the side of the radial carrying arms 65. These last mentioned parts are shown in engagement in Fig. 17 and released in Fig. 19. There is a detaining pawl 70 for each one of the carrying arms, said detaining pawls being pivotally mounted upon the shaft 72. A bar 63ᵇ is mounted in the rocking frame 63 in such position that when said frame is rocked in clockwise direction it will throw the detaining pawls 70 out of engagement and permit the springs 68 to bring the carrying pawls 67 down and rotate the computing wheels all one space. This is for "increasing by unity" when a certain hereinafter described method of subtraction is being utilized.

In order to provide means for deferring the carrying action one unit in each computing wheel, when subtraction or division is being performed according to certain optional methods of operating my machine, the shaft 72 is not made stationary but is suspended from the shaft 42 by two parallel links 73, shown, for example, in Figs. 11, 13, 22 and 23. Said links are freely rotatable upon shaft 42 and by preference the shaft 72 is rigidly attached to the links so that it will always remain parallel with the shaft 42. The detaining pawls 72 are held at the proper location sidewise on shaft 72 by spacing sleeves 72ª indicated in dotted lines in Figs. 17 and 19. The position of the shaft 72 is controlled by two parallel controlling arms 74 rigidly secured to a rock shaft 75 operated by a handle 76, shown in Figs. 1, 2, 5, 6, 8 and 22. This lever, which, for convenience, may be referred to as the deferring lever, is held in the desired one of its two possible positions by any suitable means, for example, the pin 77, see Fig. 13, which may be sprung into and out of suitable holding apertures in the side of the casing of the machine.

It has been hereinabove shown that the springs 68 tend to pull the carrying arms 65 and carrying pawls 67 in a direction to rotate the computing wheels forward, but that this action, which would cause carrying, is normally prevented by the detaining pawls 70, which engage the lugs 71 on said carrying arms 65. I therefore provide means for automatically throwing the detaining pawls 70 out of engagement with said lugs to cause carrying at the proper time, and this is done by means of carrying pins 78 which project out toward the right from the sides of the computing wheels in such manner as to act upon the cam surfaces 70ª formed upon said detaining levers, as shown in detail in Figs. 17, 18, 19 and 22. The parts are so arranged that at the carrying point the pins 72 will throw the detaining levers out of engagement with the lugs 71, and permit the springs 68 to advance the next higher computing wheel one space. This carrying movement is limited to one space by a hook 67ª on the carrying pawl adapted to engage a shoulder 60ᵇ formed in such position upon the arresting pawl 60 as to be engaged by said hook when the wheel has rotated one space and thereby throw the pawl into engagement with the wheel to hold it. The normal position of the parts when no carrying has taken place is shown in Fig. 17, while in Fig. 19 the carrying pawl is shown in the act of holding the arresting pawl in acting position.

The carrying arms 65 and carrying pawls 67 are reset by means of a bar 80, shown in perspective in Fig. 30 and in detail in Figs. 17, 19, 22 and 28. Said bar is U shaped, as shown, its parallel arms being loosely pivoted upon the stationary shaft 42. The cross piece of said bar underlies the ends of the carrying arms 65 so that the raising of said bar will raise said arms and the carrying pawls mounted thereon. Each detaining pawl 70 has a spring 81 secured to it in such manner as to create a constant tendency for said detaining pawl to move into engagement with the associated lug 71 to hold it and the connected parts in the raised position shown in Fig. 17.

In normal position the resetting bar is down as shown in full line in Figs. 17, 19 and 30. It assumes this position by action of gravity or otherwise as soon as it is released from the resetting pawls 82. Said pawls are for the purpose of raising said resetting bar to the position shown in dotted lines in Fig. 17 and full lines in Fig. 28. It is this raising of the resetting bar which resets the detaining pawls and carrying pawls. It also releases certain pawls 96 shown in detail in Fig. 26 and hereinafter described.

The resetting pawls 82 are articulately suspended from the forward end of the wrist levers 3, and are acted upon by springs 83 to move into engagement with the resetting bar. Said pawls are released at the proper time or tripped by tripping dogs 84, the ends of which take under the shoulders or projections 82ª on pawls 82 after said pawls have been raised to highest position as shown in Fig. 28. The parts are so arranged that as soon as the pawls 82 have been tripped and the bar 80 released, said projections 82ª will slip off the ends of the tripping dogs and thus permit the subsequent lowering of the pawls and of the wrist levers 3. The tripping dogs are pivotally mounted upon stationary studs 85 best shown in Figs. 28 and 30, and are spring urged to acting position by means of springs 86.

It is obvious that the resetting bar 80 will be raised every time the wrist bar 2 is depressed so that the carrying pawls will be reset every time a carrying action takes place. The parts are so timed that the resetting bar will be released at the beginning of the up stroke of the wrist bar, for it is during the up stroke that the computing wheels are rotated forward, and the resetting bars must be out of the way so as not to interfere with the carrying movement of the arms 65 and carrying pawls 67. As a matter of fact the action of the tripping dogs in engaging and acting upon the resetting pawls 82 takes place during the lost motion portion of the movement of the wrist bar, which lost motion effect is produced through the coöperation of the parts 5, 6, 9 and 11, shown in detail in Figs. 8 and 8ª. This lost motion occurs at the end of the down stroke and beginning of the up stroke of the wrist bar.

*Restoring mechanism.*—I will now take up the mechanism by which the computing wheels are restored to zero position after computation is complete: The pins 78, which extend from the side of the computing wheels, as previously mentioned, are adapted to be engaged by restoring hooks *f* in the manner indicated in Fig. 22. These hooks which are also shown in Figs. 3, 4, 19 and 23, are pivotally supported upon a shaft *g*, which is fastened to two restoring arms *h* loosely mounted upon shaft 42. A rod *i* extends through all of the hooks *f* and thereby causes all of said hooks to operate in unison. A spring *j*, best shown in Fig. 19, tends to move hooks *f* into engagement with pins 78. The hooks are normally held out of engagement by shoulders *k'* formed upon the levers *k* in position to contact the rod *i* as best shown in Fig. 11. There are two of these levers *k* and they are rigidly secured to the rock shaft *m* journaled in the frame work of the machine. Said levers are spring urged to remain normally in raised position to engage the rod *i* and hold the hooks out of engagement. A restoring key *n* is connected to lever *k* for depressing it. The restoring arms *h* are connected to levers *k* by means of links *p*, the arrangement being such that when the levers are depressed they will swing the arms *h* far enough to bring the computing wheels to zero position.

In order to prevent overthrow of the computing wheels when the latter are being restored, I provide means for throwing the arresting pawls 60 into acting position at the proper time. This is accomplished by means of slotted links *r* best shown in Figs. 11 and 22, said links being pivoted at the upper end to the rocking frame 63 in which said arresting pawls are mounted. The lower ends of the links are engaged by pins on levers $k$ which play in the slots $r'$ of said links. Said slots are provided for permitting lost motion so that the arresting pawls will not come into action until the restoring mechanism has completed its action.

*Denomination carriage actuating means.—* I will next describe the means for causing the travel and return of the denomination carriage: I have previously mentioned that the denomination carriage which is shown in details in Fig. 34, is constantly urged toward the left by the spring 48 but is normally held by the escapement dog 49. The escapement dog is thrown out of engagement with the teeth $44^c$ on the oscillating bar 44 by the projecting finger $49^a$ of the escapement dog striking the escapement bar 95 just as the oscillating bar and denomination carriage are arriving at normal position after having completed the required amount of rotation of the engaged computing wheel. Now, according to the principle of operation on my machine it is not necessary that the denomination carriage should travel to the position of next higher order or denomination every time the oscillating bar is oscillated. This will be illustrated by the following example in which 46 is to be multiplied by 3.

```
   46
    3
   ──
   18
   12
   ──
  138
```

The first partial product is 18 and the second partial product is 12. The 2 of the second partial product comes in the same column or denomination as the 1 of the first partial product and hence, the denomination carriage must occupy the same lateral position and act upon the same computing wheel for the 2 of the second partial product as for the 1 of the first partial product. Therefore, after the 1 of the first partial product has been set up the carriage must not escape, but must remain in the same lateral position until after the 2 of the second partial product has been set up. As the oscillating bar in my machine always returns to the same normal position, I have arranged to have the escapement bar 95 occupy two positions, to wit, an acting position where the dog 49 will be thrown out of engagement with the ratchet teeth on the oscillating bar, and a non-acting position where this releasing effect on the dog will not take place. In Figs. 17, 19 and 26 the bar is shown in acting position, and in Fig. 34 in non-acting position, the oscillating bar in the last mentioned figure being assumed to be in normal position. The escapement bar extends parallel to the oscillating bar and is supported upon two arms $95^a$ loosely mounted upon stationary shaft 42. Said bar is held in acting position by a pawl 96 pivoted upon a stationary shaft 97. In the present construction the upper end of the arm $95^a$ is engaged by a shoulder $96^a$ formed on the pawl as best shown in Fig. 26. Said pawl is held in acting position by a spring 98, and is raised by the rising action of the resetting bar 80. The raised position of the pawl is shown in dotted lines in Fig. 26.

The escapement bar 95 is moved to acting position by two links 100, which are articulately connected at one end to the upper end of the arms $95^a$ and at the other end to bell cranks 101 loosely mounted upon shaft 4. Said bell cranks are operated by links 102 which connect with the transverse universal bar 103. Said bar is U shaped and, as best shown in Fig. 8, the parallel arms of the bar are pivoted upon stationary studs 104, so that said bar is free to oscillate about said studs and the transverse portion of the bar is free to move in an approximately vertical direction. Said bar is normally held in raised position by a spring 105. The depressing of universal bar 103 is effected by the units key levers 18, which are longer than the tens key levers 19, as shown in Figs. 3 and 4, being long enough to project over the top of said universal bar. The movement required is slight and is arranged to take place at the end of the down stroke of the key levers. The reason that the units key levers only are constructed to operate the bar 103 to produce escapement or travel of the denomination carriage lies in the fact that two digits are sufficient to express the product of any two digits and, therefore, in multiplying, the tens key levers need not produce any escapement of the carriage, for the units of the next partial product will be placed in the same ordinal place as the tens of the first partial product. This principle will become apparent by referring to the last example of multiplication hereinabove given.

In multiplying, in case the product of two digits is a concrete number ending in zero (*e. g.* 5×6 equals 30) the oscillating bar 44 will not be rotated even a single full space when the 0 is set up, and yet to set up the product (30) there must be a lateral movement of the carriage one space to the left. As the parts are here constructed, the escapement dog will not release the carriage unless there is some slight movement of said dog first away from and then back toward the escapement bar 95. Therefore, to take care of such a case as the one just given I provide special means for producing a slight movement of the oscillating bar great enough to enable the escapement bar to cause the travel of the carriage. The means provided for the purpose are best shown in Fig. 14. A curved lever 107 is rigidly secured to the rocking fulcrum shaft 4 and carries on its end a roller 108. The parts are so proportioned that, in case the oscillating bar 44 is not rotated by the key levers, the roller 108 in its upward movement due to the downward movement of the wrist bar, will contact said oscillating bar and move it a very slight distance toward the left (Fig. 14). The amount of movement will be less than a full space on the computing wheels, and yet it will be sufficient to produce the escaping action of the denomination carriage.

I have now described the manner in which the denomination carriage escapes or travels toward the left from units of lower order to units of higher order. I will now describe the means for resetting it to units order.

*Resetting mechanism for denomination carriage.*—A resetting key 110, shown in Figs. 1, 5 and 7, is rigidly secured to the resetting lever 111. Said lever is loosely fulcrumed upon the shaft 4 as shown in detail in Figs. 26 and 27. Extending down from said lever is a finger 111$^a$, which is adapted, when the lever is depressed, to depress the bar 112. Said bar is supported in the parallel side arms 113$^a$, which, with the cross bar 113 form a U shaped resetting frame shown in Figs. 3, 4, 5, 10, 26 and 27. Said frame is fulcrumed upon the stationary shaft 114, and the free end, a fragment of which is shown in Fig. 17, is normally held in raised position by a spring 115, which, in the present design is coiled around the bar 112 and at one end rests upon the vertically fixed resetting rod 116 and at the other end projects over the upper edge of the pawl 117 as shown in detail in Figs. 26 and 27. The free end of the left arm 113$^a$ of the resetting frame has a large aperture 113$^b$ (see Fig. 17) through which the resetting rod 116 passes. This is to permit vertical movement of said arm. This arm has a finger 113$^c$ adapted, when in lowered position, to contact the left end of the denomination carriage to move the latter toward the right to reset it. The purpose in holding the finger 113$^c$ normally in raised position is to enable it to clear and not interfere with the movement of the oscillating bar 44.

The resetting frame is laterally shiftable along shaft 114 and is normally urged toward the left by the spring 118 as shown in Fig. 2. The resetting frame and denomination carriage are moved toward the right to units column by the resetting rod 116 above mentioned, which is supported in the side walls of the frame work of the machine in such manner as to be laterally shiftable. Said resetting rod, which is shown in detail in Fig. 32, has at its left end a head or handle 116$^a$ by which it may be operated, and at its right end a spring 116$^b$ for urging it toward the left. Rigidly secured to the rod is a bushing 116$^c$ which is rigidly secured to the rod and is adapted to engage arm 113$^a$ to push the resetting frame toward the right. The right end of the bushing is beveled as shown, to facilitate entrance into the aperture 113$^b$. In operation, when it is desired to reset the carriage the key 110 is depressed, thus depressing the lever 111 and the arms 113$^a$ of the resetting frame. This brings the finger 113$^c$ down in position to engage the left end of the denomination carriage, after which the operator pushes the resetting rod 116 toward the right, thus pushing the resetting frame and denomination carriage toward the right. In order that the escapement dog of the denomination carriage may at this time clear the escapement bar 95, the operator depresses the wrist bar 2, thus causing the zero lever 107, shown in Fig. 14, to rise and throw the oscillating bar 44 and denomination carriage slightly toward the left as hereinabove described. As soon as the carriage has thus been reset, the operator releases the wrist bar and resetting rod, permitting them to return to normal position, while the denomination carriage remains at the units column.

*Recording mechanism.*—I have now described the calculating parts of the machine and will next take up the recording mechanism whereby a record is made of the computations. For convenience, the recording mechanism will be treated under two heads, to wit: the paper carriage and the printing mechanism.

*The paper carriage.*—The paper or work sheet is supported by the platen, which in the present instance consists of a roller 120. The paper is held close to the roller by the stationary holder 121 as shown in Figs. 3, 4, 14, 16 and 36. It is also held by the rod 122 which is provided with rubber rollers 123. The roller 120 is rotatable about its central longitudinal axis, being supported at the ends by an axle 124, which is journaled in arms forming a part of the slide bar 125. Said slide bar travels upon the stationary track 126. A hand wheel 127 is provided at the right end of the roller for rotating it about its longitudinal axis. At the left end a ratchet wheel 128 is rigidly secured to the roller for enabling it to be rotated by the pawl 129 as shown in detail in Figs. 36 and 37. Said pawl is pivoted upon a stud 130 rigidly secured to an arm 131 loosely pivoted upon the axle 124. Said arm is oscillated about axle 124 as a center by means of a hand rod 132. Said hand rod is supported at one end by the arm 131 and at the other end by an arm 133 located at the opposite end of the paper roller and similarly loosely pivoted upon the axle 124. (See Figs. 1, 2 and elsewhere.) Rod 132 is normally held in raised position by spring 134 attached to the stationary plate 135. A small spring 136 best shown in Fig. 37, tends to urge pawl 129 into engagement with the teeth of the ratchet 128 but this is prevented under normal conditions by a pin 137 secured to the side of plate 135 and acting upon a cam 129$^a$ formed upon said pawl. The action is such that when the hand rod 32 is depressed the arm 130 will lower the pawl and bring the cam out of engagement with pin 137 thus permitting the small spring 136 to throw the pawl into engagement with the teeth of the ratchet. When the hand rod is released, and the spring 136 returns to normal position shown in Fig. 37, the cam will again be brought into contact with the pin and throw the pawl out of engagement. The advantage in this construction is that the pawl, being normally out of engagement, permits the paper roller to be rotated freely in either direction by the operator and yet the pawl is automatically thrown into action when the hand rod 132 is used. A stop 135$^a$ is formed on plate 135 in such position as to arrest arm 131 when the pawl 129 has been moved far enough to rotate ratchet 128 a distance equal to the distance from one line on the paper to the next one beneath it.

Now to consider the means for controlling the position of the paper carriage laterally, the slide bar 125 has notches 125$^a$ formed at the lower edge into which a spring urged pawl 138 tends to enter as clearly shown in Figs. 5 and 26. Said pawl is pivoted upon a stud 139 mounted upon a platen actuating frame 140 adapted to slide upon the stationary rod 141. Frame 140 is prevented from rotating around rod 141 by a projecting fork which engages the shaft 114. Said frame is normally urged toward the columns of higher order by a coiled spring 142 which encircles rod 141. Said frame is pushed toward the columns of higher order by an anti-friction roller 143 acting upon a cam 140$^a$ forming part of frame 140 as shown in detail in Figs. 28 and 29. Said rollers are carried by one of the studs 3$^a$ previously mentioned. The construction is such that if pawl 138 is in acting position every downward stroke of the wrist bar 2 will cause the paper carriage to move to the column of next higher order. In my machine, in multiplying, this automatic movement of the paper carriage must take place only when the units figure keys are operated and not when the tens figure keys are operated. Hence, I provide means operated by the tens figure keys for preventing this travel or escapement of the paper carriage when the tens figure keys are being operated. This preventing means consists of an extension 96$^b$ formed on the end of the locking pawl 96 previously described. By reference to Fig. 26 it will be seen that when the resetting bar 80 rises it will lift the extension 96 high enough to engage pawl 138 and hold the same out of engagement with the notches 125$^a$ of the slide bar 125. When pawl 138 is held in this position the platen actuating frame 140 will move forward and back without affecting the bar 125 on which the platen is carried. The resetting bar 80 does not remain in raised position to thus hold pawl 96 in engagement with pawl 138 but pawl 96, after once being raised will be held raised by the shoulder 96$^a$ on said pawl which will rest upon the top of arm 95$^a$ until another units figure key is operated.

The overthrow of the paper carriage, when moving toward columns of higher order, is prevented by pawl 145 shown in detail in Figs. 24 and 25, and on a smaller scale in Fig. 12. This pawl is pivoted upon a stationary pin 146, and when in raised position enters the notches 125$^a$ in the slide bar 125 as indicated in dotted lines Fig. 24. Gravity tends to normally hold said pawl out of engagement as shown in full lines in Figs. 12 and 24. Said pawl is raised to acting position by a pin 145$^a$ extending from its side into a slot 147$^a$ formed in a lever 147 rigidly secured to the rocking bar 4. It will be remembered that bar 4 is rocked by every movement of the wrist bar 2, and the arrangement of the parts is such that every time the wrist bar is depressed the pawl 145 will, at the end of the stroke, be thrown into engagement with the slide bar 125 to prevent excessive movement or overthrow thereof.

The resetting of the paper carriage and platen to units column is accomplished by the resetting pawl 117 hereinabove mentioned and shown in detail in Fig. 26. Said pawl, which is fulcrumed upon the bar 112 carried by the vertically oscillating arms 113$^a$ of the resetting frame, is urged by the spring 115 to rotate in a direction to throw the acting end thereof into the notches 125$^b$ in the upper edge of the slide bar 125. The arrangement of these notches is best shown in Fig. 36. In the design here shown the platen or paper roller is wide enough to accommodate several groups of columns so that calculations can take place at various positions on the paper laterally at the option of the operator. There will be a notch 125$^b$ for each of these groups of columns, there being four of them in the present instance. When the arms 113$^a$ of the resetting frame are down (which is the condition during the act of resetting) the acting end of pawl 117 will slide upon the smooth portion of bar 125, but will drop into a notch 125$^b$ when it comes to it and then move the paper carriage to units position. When the arms 113$^a$ are up, which is the normal condition, the pawl 117 will be held out of acting position by its rear end 117$^a$, contacting the under edge of the resetting rod 116.

*Printing mechanism.*—I will first call attention to the fact that in my machine there are three mechanisms or sets of devices for printing. In addition or subtraction two sets only are used while in multiplying or dividing, three sets are used. In adding or subtracting the two sets used are what I shall term, the "listing" mechanism and the "total printing" mechanism. The listing mechanism is the one which records or lists the various items to be computed. The total printing mechanism is the one which records the result of the computation. The "factor printing" mechanism, which constitutes the third, is for setting down on the paper the multiplier or divisor. It is operated by the factor keys in the manner hereinafter described.

*The listing mechanism.*—All of the listing is done by a single listing type bar 150, shown in detail in Fig. 39. This bar has on its under face type running from 0 to 9. This bar is suspended above the roller of the paper carriage in such manner that when depressed it will make an impression upon the paper, the value of the figure imprinted depending upon the longitudinal position of the said bar. Said bar which is shown in Figs. 12, 24 and 39, is moved longitudinally by a bell crank 151 to which it is articulately connected. A spring 152 exerts a continuous tendency to move the bar to the right (Figs. 12 and 24) so as to bring the 0 type into printing position. Bell crank 151 is fulcrumed upon the shaft 153 and is operated by the listing differential bar 154 to which it is articulately connected. Said bar, which is shown in detail in Fig. 33, extends across the machine beneath the ends of the units key levers 20 so as to be contacted thereby when the latter are depressed. Said differential bar is supported upon rocker arms 155 pivoted upon the stationary pins 156, and is normally held in raised position by springs 157 as shown in Fig. 24. The upper acting edge of said differential bar is so configurated that the 1 key lever will move it one space, the 2 key lever two spaces, etc. It will thus be apparent that the units figure keys will cause the longitudinal shifting of the listing type bar to proper position to print the figure or digit required.

The listing type bar 150 is normally held in raised position by a controlling arm 158 which is loosely mounted on shaft 4 and has two rollers 159 and 160 which contact the upper and lower edges of said bar respectively as shown best in Fig. 12. A spring 161 exerts a constant tendency to pull arm 158 down with sufficient force to cause bar 150 to print. Arm 158 is normally held in raised position by a pawl 162 pivoted at its lower end on stationary pin 163 and adapted to engage at its upper end a lug 164 extending from the side of said arm. Pawl 162 is thrown out of engagement at the proper time by a link 165 which connects the pawl with the universal bar 103. This is shown in detail in Fig. 24. A circular ratchet 166 centered on shaft 153 is so constructed as to rotate in unison with the bell crank 151, the two parts being preferably pinned together. A pawl 167 fulcrumed on a stationary shaft 168 is located in position to engage the ratchet to hold the listing type bar 150 in the position to which it is brought by the listing differential bar 154. Pawl 167 is raised to dotted position (Fig. 24) at the proper time by the pin 147$^b$ extending out from the side of lever 147, which as previously mentioned, is rigidly secured to the rocking fulcrum shaft 4 which is rocked by the wrist bar and wrist levers. Lever 147 has a lateral extension 147$^c$ adapted to engage the under side of controlling lever 158 to hold the latter and the lifting type bar in raised position.

In my machine the listing type bar 150 is never operated by the tens key levers but only by the units key levers. The reason is that when the tens key levers are used, the total printing or factor printing devices or both of them are used. Bearing this in mind the program of operation of the parts which operate the listing type bar is as follows: A units figure key is depressed, followed by the depression of the wrist bar. The descending units key lever depresses the listing differential bar 154, and at about the end of its stroke also depresses the universal bar 103. Said differential bar acting through the bell crank 151 draws the type bar to the proper location while the universal bar throws pawl 162 out of engagement with the lug 164. The wrist bar, which is now at the bottom of its stroke holds lever 147 in raised position as shown in dotted lines Fig. 24, thus holding the controlling bar 158 and type bar 150 in raised position. The depressing of the universal bar causes the pawl 96 to come into acting position as shown in Fig. 26 and consequently pawl 162 will be held out of acting position. As soon as the wrist bar commences to rise the lever 147 commences to descend, thereby permitting pawl 167 to immediately drop into engagement with the ratchet 166 and hold the listing type bar in proper position longitudinally. As the wrist bar rises and lever 147 descends the spring 161 pulls the controlling arm 158 down, thus causing the listing type bar to move toward the printing roller and make the impression upon the paper. It will be remembered that the wrist bar is operated also when the tens key levers are operated. Action of the listing type bar at this time is prevented by the pawl 162, for the depressing of the wrist bar will raise the controlling arm to the position shown in Fig. 12 where said pawl comes into action, but as the tens key levers are too short to act upon the universal bar 103, said universal bar is not depressed and, therefore, pawl 162 remains in action to hold the listing type bar 150 aloft.

Ink is supplied to the listing type bar 150 by an inking roller 170 shown in Fig. 12 and in detail in Fig. 31. Said roller is supported upon a resilient arm 171 depending from a convenient part of the frame work 1 in such manner that when the bar is raised the roller will slip under the face of the type bar and ink it, but when said bar is depressed said arm will yield and permit the bar to force the roller aside as indicated in dotted line Fig. 31.

*Printing and carrying preventer.*—When operating according to one method, it is necessary at times in subtracting and dividing by the theory of complements, to prevent the carrying action from taking place. For example, in subtraction, there must be no carrying at the digit of highest order in the subtrahend. I obtain this preventing action at the proper time by means of a hand lever 172 shown in Figs. 10, 26 and 27. Said lever is pivoted upon stationary pin 173 and has an arm 172$^a$ adapted when the handle is pulled to dotted position, shown in Fig. 26, to back up the arm 95$^a$ of the escapement bar 95, thus holding said escapement bar in acting position to cause the traveling action of the denomination carriage. Said hand lever is also provided with a hook 172$^b$ at its lower end adapted to hold the resetting bar 80 in raised position when the handle is pulled to dotted position. By thus holding the resetting bar in raised position the action of the carrying arm 65 and carrying arms 67 is prevented.

In order to hold the listing type bar 150 out of action when operating my machine upon the theory of complements, I have provided means for holding it aloft at such time. In this the preferred construction this effect is obtained through the instrumentality of the same hand lever or handle 172. I place upon it a laterally extending pin 172$^c$, best shown in Figs. 10, 24, 25 and 27. Said pin is so located as to come beneath the lug 158$^a$ formed upon the side of the controlling arm 158 and hold the same in raised position. The parts are so proportioned that this action may take place when the handle is thrown only part way, that is before it is thrown far enough to prevent the carrying action as just pointed out.

*Total printing mechanism.*—This is the mechanism employed for recording the result of any computation in my machine whether it be addition, subtraction, multiplication or division. In the total printing device there is a total-printing type bar 175 for every computing wheel in the machine. These bars are indicated in Figs. 1, 2, 3, 4, 14 and 38. Each bar is urged forward by a spring 176. Said bars are normally held in raised position by a cross bar 177 carried by the free end of a number of links 178 fulcrumed upon the stationary shaft 179. There is a link 178 between each of the type bars and they therefore act as lateral spacers and guides. The bar 177 is normally held in raised position by a spring 180 shown in Fig. 10. This spring is fastened to the arm 181, which is rigidly secured to shaft 179 and exerts a tendency in such direction as to rotate shaft 179 in clockwise direction (when viewed as in the drawing) thus holding bar 177 and the type bars raised.

At the rear end each bar 175 is articulately connected to a lever 182 which is loosely mounted upon shaft 97 previously mentioned. Each lever 182 is provided with gear teeth 183 adapted to mesh with the teeth of the vertically movable rack 184 as shown in detail in Fig. 17. Each rack is guided by suitable means such as the stationary guides 185. Said racks are bent in such manner as to have feet 186 formed thereon which stand radially with respect to the computing wheels and are adapted, when raised, to enter the radial slots 51$^b$ in said wheels. Said slots are of different depths so as to let the racks rise to the proper distance to let the springs 176 move the type bars 175 forward to where they will print the digit called for by the position of the computing wheel. For example, the parts are so constructed that if a computing wheel has been rotated six paces forward from zero the corresponding type bar will be moved forward to a position where it will print 6.

The type bars 175 are normally held retracted by means of a cross bar 187 carried by the levers 188 in position to contact the forward edge of the levers 182. Levers 188 are loosely mounted upon shaft 97 and are held in retracted position by a spring 189. When the levers 188 move forward toward the paper roller 120, they permit the type bars to move forward until stopped by the feet 186 striking the bottom of the slots 51$^b$ of the computing wheels. At their free end the levers 188 carry a hammer 190 adapted to contact the top of the bars 175 to force them against the paper for printing. Said levers 188, which may be called the printing levers, are operated by a handle 191 of any suitable form.

As best shown in Fig. 14 the printing levers 188 are locked in retracted position by a pawl 192 pivoted upon the shaft 114 and adapted to engage the lug 188ª shown in dotted lines to be on the far side of the lever 188. Pawl 192 is lowered by hand at the proper time to release lug 188ª by mechanism presently to be described.

The type bars 175 are inked by a pad 193, which is supported on links 194 and 195 as best shown in Figs. 3, 4 and 14. This pad must be out of the way when hammer 190 descends and this is accomplished by depressing the pad-retracting key 196 best shown in Figs. 1, 5, 7 and 14. Said key is spring influenced to normally remain in raised position and is articulately connected at its lower end to a lever 197 loosely mounted on shaft 4 and adapted to engage the hand rod 132 for rotating the paper roller 120 to feed the paper one line forward. Link 195 above mentioned is in the form of a bell crank and is articulately connected to lever 197 by a link 198. By referring to Fig. 14 it will be obvious that when key 196 is depressed it will not only depress lever 197 and feed the paper one line forward, but will also swing the inking pad 193 down to the left as indicated in dotted lines. The parts are so timed that the paper roller will have fed the paper forward the proper distance before the type bars reach the paper. Lever 197 is connected to pawl 192 above described by link 199 shown in Fig. 14, so that the depression of key 196 will also throw pawl 192 out of engagement with the lug 188ª to permit the operator to bring the printing hammer 190 forward.

In order to justify the type of the various type bars so that they will all come into horizontal alinement, I provide a stationary transverse bar 200 shown in Figs. 1, 2, 3 and 4, the upper edge of which is wedge shaped so that the notches in lower edge of the type bars will descend over the upper edge of said stationary bar and move the type bars a slight distance forward or back as the case may require.

*Factor printing mechanism.*—In certain computations in my machine when a multiplying factor is employed, the said factor must be recorded, and this I accomplish by the factor printing mechanism which I will now describe. A single factor printing type bar 201 is articulately connected at its rear end to a lever 202 loosely mounted upon the shaft 153 previously mentioned. The type bar is constantly urged in a forward direction by means of a spring 203 and is normally held in raised position by a cross bar 204 supported in two parallel links 205 loosely fulcrumed on stationary shaft 179. Cross bar 204 is normally held in raised position by a spring 206 connected to one of the links 205. This type bar has type on its under face arranged in the same manner as on the listing type bar 150 shown in detail in Fig. 39. It is inked by a roller 207 suspended on an arm 208 in a manner similar to the inking roller previously described.

Lever 202 and the type bar 201 are controlled by a link 209 articulately connected at one end to lever 202 and at the other end to the factor carriage 25 which, as previously mentioned is horizontally shiftable forward and back under the action of the factor key 38. The factor carriage normally occupies the position shown in Fig. 16 in which the "1" type is in printing position. The carriage is held in this position by a stop 210 which is rigidly secured to a rock shaft 211 and is normally held in the acting position shown by a spring 212 which holds it down in contact with the stop pin 213. A zero key 214 shown in plan in Figs. 1 and 2 and in rear elevation in Fig. 5 is rigidly secured to shaft 211, and when the key is depressed it raises the stop 210 out of acting position and lets the factor carriage move backward until it contacts the stationary stop 215 shown in Fig. 16, where it will bring the 0 on the factor printing bar to printing position.

When the factor printing type bar 201 has been brought to proper printing position by the mechanism just described it may be caused to print by depressing the factor printing key 216, which is adapted to contact the upper edge of the bar. For convenience it is desirable to mark this key "1" for when this key is depressed with the parts in normal rest position, it will print 1 on the paper.

*Operation.*—The operation of the various groups or parts which go to make up the complete organism has been described in connection with the description of the groups themselves and of the parts whereof they are composed. I will now describe the general operation of the machine by illustrating the manner of procedure in computing typical examples.

Example A: Let it be assumed that 27 is to be added to 436, thus:

```
 436
  27
 ———
 463
```

For this calculation the tens keys 19 and the factor keys 38 are not used. The operator first depresses the 6 figure key and then while holding it down depresses the wrist lever 2, after which he releases them both and the denomination carriage moves one step to the left to tens column. The operator then depresses the 3 figure key and then the wrist bar and releases them, after which the denomination carriage again escapes one space to hundreds column. He then depresses the 4 figure key and operates the wrist bar, with the result that the computing wheels are set to 436 and the listing type bar 150 will have automatically listed or recorded the item on the sheet of paper. The operator then resets the denomination carriage and paper carriage to units column by operating the resetting bar 116 as already described. He then proceeds with the next item (27) in the same manner with the result that the computing wheels will have been rotated to correspond to the sum, which is 463. The operator then records this total by first depressing key 196 with his left hand and then with his right hand throwing the printing handle 190 down and then releasing it. If this is the only calculation desired the operator then restores the computing wheels to zero by depressing the restoring key $n$ while holding the wrist bar depressed and the resetting rod 116 as far to the right as it will go. The machine is then ready for the next computation.

Example B: Let it be assumed that 32 is to be multiplied by 6, thus:

$$\begin{array}{r}32\\6\\\hline 192\end{array}$$

To perform this calculation the units figure keys, tens figure keys and factor keys are all called into operation. As indicated in the preamble of this specification the operator first depresses the 6 factor key and then while holding it down operates first the 2 units figure key, then the wrist bar, then the 2 tens key, then the wrist bar, then the 3 units key, then the wrist bar, then the 3 tens key, then the wrist bar, after which the factor key is released. The factor or multiplier 6 is recorded by the operator depressing the key 216 (see Fig. 16) and causing the factor type bar 201 to print after first depressing the factor key and before proceeding to operate the figure keys. The product 192 will be set up on the computing wheels, and this product is recorded by operating the total printing mechanism, as above described.

Example C: Let it be assumed that 46 is to be subtracted from 87, thus:

$$\begin{array}{r}87\\46\\\hline 41\end{array}$$

The operator first depresses the 9 factor key and while holding it down depresses the 7 figure key then the wrist bar, then the 8 figure key and then the wrist bar. This causes the printing or listing of the minuend 87, but on the computing wheels there will be set up the true complement of the minuend 87 or 23. This true complement results because of the arithmetical fact that in every partial product where 9 is the multiplying factor, the units digit of the partial product is the true complement of the digit multiplied. This theory has been explained in my Patent 938,550 in connection with the multiplication table there illustrated. After the operator has thus obtained the true complement of the minuend 87 or 23, he releases the factor key. He then pulls the subtracting lever 76 to position to advance the detaining pawls 70 one space in consequence of which the carrying in each computing wheel would be deferred one space, if carrying action were called into play by the example in hand, but this is not the case with example C as selected. Next he sets up the subtrahend 46 by depressing first the 6 figure key then the wrist bar, then the 4 figure key, then the wrist bar. This will cause the listing on the paper of the minuend 46 and will move the computing wheels to 69, which is the "true" complement of the answer. It then becomes necessary to "translate" this true complement into the actual number. This he does by first depressing and holding down the 8 factor key and throwing the lever 172 to such position as to prevent carrying and listing. Next he depresses the 9 figure key then the wrist bar, then the 6 figure key, then the wrist bar. This brings the computing wheels to 41 which is the proper answer to the problem. He then prints by operating the printing handle 191. The following is the theory upon which the 8 factor key is employed in "translating" from true complements to the actual number. The units digits in the partial products of 69 multiplied by 8 are 8 and 2. If 8 and 2 are added to the respective digits 6 and 9 of the true complement 69 they will produce the actual number of the answer, to wit, 41, it being remembered that the carrying action is prevented.

If the printing of the subtrahend is not desired, my machine may be operated more simply by merely setting up the minuend then adding the "practical" complement of the minuend then printing the result which will be the practical complement of the true answer. Division may be performed in my machine along analogous lines taken in connection with the well known theory of complements. In certain of the calculating machines now on the market, when division is to be performed it is accomplished by repeating the movements of the figure keys the proper number of times. This repetition is avoided in my machine by the use of my factor keys, which obviously greatly reduces the liability of mistakes, simplifies the operation, and reduces the wear and tear upon the machine.

Having thus described my invention what I claim as new and desire to secure by Letters Patent, is—

1. A multiplying machine having figure keys, computing mechanism and factor keys for causing the figure keys to produce different effects upon the computing mechanism depending upon the value of the factor key operated, said figure keys being of two kinds, units figure keys and tens figure keys, the units figure keys being for obtaining the units and the tens figure keys being for obtaining the tens of the partial products.

2. A calculating machine having computing mechanism, differential members for actuating the same, a power device and figure keys for throwing said power device into connection with any one of said differential members, said figure keys being of two kinds, units figure keys and tens figure keys, the units figure keys for obtaining the units and the tens figure keys for producing the tens of the partial products.

3. In a calculating machine the combination of computing mechanism, differential members for actuating the same, key levers for actuating said differential members, an actuator bar, a power device for operating said actuator bar, and means controlled by said key levers for connecting said actuator bar to said differential mechanism.

4. In a calculating machine the combination of computing mechanism, differential members for actuating the same, key stems for actuating said differential members, key levers for actuating said stems, an actuator bar for actuating said key levers and means for throwing any one of the key levers into and out of engagement with said actuator bar.

5. In a calculating machine the combination of computing mechanism, differential members for actuating the same, key stems for actuating said differential members, key levers for actuating said stems, an actuator bar for actuating said key levers, hooks on said key levers for actuating the same and means for throwing any one of said hooks into and out of engagement with said actuator bar.

6. A calculating machine having computing mechanism, differential mechanism for operating the same, a power device for operating said differential mechanism and figure keys for throwing said power device into and out of connection with said differential mechanism, said power device comprising a wrist bar arranged adjacent to the figure keys in convenient position for the palm of the operator when the fingers are touching the figure keys.

7. In a calculating machine the combination of computing mechanism, differential members for actuating the same, a power device including a wrist bar convenient for the palm of the operator when his fingers are on the figure keys, and figure keys for throwing said power device into connection with any one of said differential members.

8. In a calculating machine the combination of computing mechanism, differential members for operating it, key stems, means for shifting said key stems to act upon said differential members at different points, a power device, and figure keys for connecting said power device with any one of said key stems.

9. In a calculating machine the combination of computing mechanism, differential members for operating it, shiftable key stems adapted to operate said differential members at different points thereon, factor keys for shifting said key stems, and means for operating any one of said key stems.

10. In a calculating machine the combination of computing mechanism, differential members for operating it, shiftable key stems adapted to operate said differential members at different points thereon, factor keys for shifting said key stems, a power device and means for throwing said power device into connection with any one of said key stems.

11. In a calculating machine the combination of computing mechanism, differential members for operating it, shiftable key stems adapted to operate said differential members at different points thereon, factor keys for shifting said key stems, a wrist bar for furnishing actuating power and figure keys for throwing said wrist bar into connection with any one of said key stems.

12. In a calculating machine the combination of computing mechanism, key controlled differential mechanism and a power device for actuating said differential mechanism, said power device having a wrist member convenient for the palm of the hand when the fingers of the hand are upon the keys.

13. In a calculating machine the combination of computing mechanism, an actuating segment for actuating the same, said segments being spring held in raised position, differential mechanism for depressing said segment, a power member for actuating said differential mechanism, and a spring for holding said power member in raised position, said spring being connected to said segment in such manner as to assist in the depressing of the segment when the power member is depressed.

14. In a calculating machine the combination of computing mechanism, an actuating segment for actuating the same, said segment being held in raised position, differential mechanism for depressing said segment, a wrist lever for actuating said differential mechanism, a wrist bar for actuating said lever, and a spring for holding said lever in raised position, said spring being connected to said segment in such manner as to assist in the depressing of the segment when the wrist bar is depressed.

15. In a calculating machine the combination of computing mechanism, an actuating segment for actuating the same, said segment being held in raised position, differential mechanism for depressing said segment, a wrist lever for actuating said differential mechanism, a wrist bar for actuating said lever, a spring for holding said lever and wrist bar in raised position, and a rocking member $b$ to which said spring is connected, said rocking member being adapted to act upon said segment to assist in depressing the same when said spring is strained by the depressing of said wrist bar.

16. In a calculating machine the combination of computing mechanism, an actuating segment for actuating the same, said segment being held in raised position, differential mechanism for depressing said segment, a wrist lever for actuating said differential mechanism, a wrist bar for actuating said lever, a spring for holding said lever and wrist bar in raised position, a rocking member $b$ to which said spring is connected, said rocking member being adapted to act upon said segment to assist in depressing the same when said spring is strained by the depressing of said wrist bar and a stop leg pivoted to said wrist lever for limiting the distance which the wrist bar may rise.

17. In a calculating machine, the combination of computing wheels, an oscillating bar, means for oscillating said bar proper amounts for setting up the proper digits, a denomination carriage adapted to travel along said bar for connecting it to the proper computing wheel and escapement mechanism for causing said carriage to travel, said escapement mechanism comprising a rack on said bar, an escapement dog on said carriage, and an escapement bar adapted to be contacted by said dog for operating the latter.

18. In a calculating machine, the combination of computing wheels, an oscillating bar, means comprising key operated differential mechanism with units figure keys and tens keys for oscillating said bar, a denomination carriage adapted to travel along said bar for operating the computing wheels, escapement mechanism for causing the travel of said carriage, an escapement bar for operating said escapement mechanism, said bar tending to occupy non-acting position, and means operated by the units keys for moving it to acting position.

19. In a calculating machine the combination of computing wheels, an oscillating bar, means comprising key operated differential mechanism with units figure keys and tens keys for oscillating said bar, a denomination carriage adapted to travel along said bar for operating the computing wheels, escapement mechanism for causing the travel of said carriage, an escapement bar for operating said escapement mechanism, said bar tending to occupy non-acting position, a universal bar operated by the units figure keys for moving said escapement bar to acting position, a pawl 96 for holding said escapement bar in acting position and a hand operated member 80 for releasing said pawl.

20. In a calculating machine the combination of computing wheels, an oscillating bar, means comprising key operated differential mechanism with units figure keys and tens keys for oscillating said bar, a denomination carriage adapted to travel along said bar for operating the computing wheels, escapement mechanism for causing the travel of said carriage, an escapement bar for operating said escapement mechanism, said bar tending to occupy non-acting position, a universal bar operated by the units figure keys for moving said escapement bar to acting position, a pawl 96 for holding said escapement bar in acting position, a member 80 for releasing said pawl and a wrist bar for operating said member 80.

21. In a calculating machine the combination of computing wheels, an oscillating bar, a denomination carriage traveling along said bar and adapted to rotate said wheels, an arresting pawl adapted to engage said wheels to prevent overthrow, and means on said carriage adapted to throw said pawl into acting position.

22. In a calculating machine the combination of computing wheels rotating always in the same direction, an oscillating bar adapted to rotate backward various amounts from normal position and then return to normal position, a denomination carriage traveling along said bar for rotating said wheels forward, arresting pawls for preventing overthrow of said wheels and means on said carriage for throwing said pawl into acting position when the oscillating bar is in normal position.

23. In a calculating machine the combination of computing wheels, carrying pawls, one for each wheel for rotating it forward, said pawls normally occupying initial position, a spring for moving the carrying pawls forward, detaining pawls for holding the carrying pawls in initial position and a hand operated member for releasing all of said carrying pawls simultaneously to let them rotate all of the computing wheels forward for the purpose described.

24. In a calculating machine the combination of computing wheels, carrying pawls, one for each wheel for rotating it forward, said pawls normally occupying initial position, a spring for moving the carrying pawls forward, detaining pawls for holding the carrying pawls in initial position, a hand operated member for releasing all of said carrying pawls simultaneously to let them rotate all of the computing wheels forward for the purpose described, and arresting pawls 60 operated by said carrying pawls for preventing overthrow of the computing wheels.

25. In a calculating machine the combination of computing wheels, a carrying pawl for each computing wheel adapted to rotate it forward, said pawl normally occupying initial position from which it moves forward in carrying, a spring for moving the carrying pawl forward, a detaining pawl for holding said carrying pawl in initial position, means on the computing wheel to the right or lower order for releasing said detaining pawl, and hand operated means for advancing said detaining pawl one step for deferring the carrying action one space.

26. In a calculating machine the combination of computing wheels, means for rotating them forward various amounts and restoring mechanism for rotating them all forward to restore them to zero, said restoring mechanism comprising restoring elements on said wheels all located at definite points with respect to the zero of the respective wheels, engaging members adapted to engage said restoring elements, said engaging members tending to move into acting position, and actuating means for moving said engaging members bodily forward, said actuating means comprising a normally raised restoring key adapted when in normal position to hold said engaging elements in non-acting position.

27. In a calculating machine the combination of computing wheels, carrying pawls spring urged in forward direction, a resetting member for resetting said pawls and operating means for operating said resetting member, said operating means comprising a hook 82, adapted to engage said resetting member, a hand operated lever for operating said hook, and means for tripping said hook.

28. In a calculating machine the combination of computing wheels, a denomination carriage having means for rotating said wheels forward, an oscillating bar whereon said denomination carriage travels, a lever for oscillating said bar first backward and then forward from initial position, a ratchet 90 concentric with said bar and secured thereto, and a rebound pawl 93 connected to said lever and adapted to engage said ratchet when it and the oscillating bar and lever have returned to initial position.

29. In a calculating machine, the combination of computing mechanism, an actuating member therefor, key controlled differential mechanism for operating said actuating member, a power device for furnishing the power to operate the differential mechanism, and stop mechanism actuated by said power device for preventing overthrow of said actuating member.

30. In a calculating machine, the combination of computing mechanism, an actuating member therefor, key controlled differential mechanism for operating said actuating member, a wrist bar for furnishing the power to operate the differential mechanism, and stop mechanism actuated by said wrist bar for preventing overthrow of said actuating member.

31. In a calculating machine, the combination of computing mechanism, an oscillating bar for operating the same, key controlled differential mechanism for operating said bar, a power device for furnishing the power to operate the differential mechanism, and stop mechanism actuated by said power device for preventing overthrow of said bar.

32. In a calculating machine, the combination of computing mechanism, an oscillating bar for operating the same, key controlled differential mechanism for operating said bar, a wrist bar for furnishing the power to operate the differential mechanism, and stop mechanism, actuated by said wrist bar for preventing overthrow of said bar.

33. In a calculating machine, the combination of computing mechanism, an oscillating bar for operating the same, key controlled differential mechanism for operating said bar, a wrist bar for furnishing the power to operate the differential mechanism, a ratchet secured to said bar for preventing overthrow and a pawl operated by said wrist bar for engaging said ratchet.

34. In a calculating machine, the combination of computing mechanism, key controlled differential mechanism for operating the same, a power device for furnishing the power necessary to operate said differential mechanism, a listing type bar and controlling means for controlling it longitudinally to print the proper digit, said key controlled differential mechanism comprising units figure keys for producing the units and tens figure keys for producing the tens of partial products, and said controlling means comprising a differential bar 154 operable by said units figure keys only.

35. In a calculating machine, the combination of a computing wheel having radial slots of different depths, means for rotating said wheel to different positions depending upon the digit to be added, a self projecting type bar, a handle normally holding said type bar retracted, a stop member having a foot adapted to enter the radial slots in said wheel, and gear connections between said stop member and said type bar whereby the movement of the type bar when released by said handle is proportional to the depth of the slot into which the foot has temporarily entered.

36. In a calculating machine, the combination of a computing wheel having radial slots of different depths, means for rotating said wheel to different positions depending upon the digit to be added, a self projecting type bar, a handle normally holding said type bar retracted, a rack having a foot adapted to enter the radial slots, a gear wheel meshing with said rack and connections between said gear wheel and type bar whereby the movement of the latter when released by said handle is proportional to the depth of the slot temporarily entered by the foot of the rack.

37. A calculating machine having figure keys, computing mechanism, factor keys for causing the figure keys to produce different effects upon the computing mechanism depending upon the value of the factor key operated, and a printing member controlled by said factor keys.

38. A calculating machine having figure keys, computing mechanism, factor keys for causing the figure keys to produce different effects upon the computing mechanism depending upon the value of the factor key operated, and a longitudinally movable type bar adapted to be moved longitudinally by said factor keys.

39. A calculating machine having figure keys, computing mechanism, factor keys for causing the figure keys to produce different effects upon the computing mechanism depending upon the value of the factor key operated, a platen, a type member controlled by said factor keys to present different type to said platen, and hand operated means for moving the type member bodily toward the platen to print.

In witness whereof I have hereunto subscribed my name in the presence of two witnesses.

JOHN BRICKEN.

Witnesses:
HOWARD M. COX,
MARGARET D. ROBB.